United States Patent [19]
Abe

[11] Patent Number: 5,473,369
[45] Date of Patent: Dec. 5, 1995

[54] OBJECT TRACKING APPARATUS

[75] Inventor: Keiko Abe, Kanagawa, Japan

[73] Assignee: Sony Corporation, Tokyo, Japan

[21] Appl. No.: 200,710

[22] Filed: Feb. 23, 1994

[30] Foreign Application Priority Data

Feb. 25, 1993 [JP] Japan ................. 5-061060

[51] Int. Cl.$^6$ ..................................... H04N 7/18
[52] U.S. Cl. ........................... 348/169; 348/170
[58] Field of Search ................... 348/169, 170, 348/171, 172; H04N 7/18

[56] References Cited

U.S. PATENT DOCUMENTS

| | | | |
|---|---|---|---|
| 4,364,089 | 12/1982 | Woolfson | 348/169 |
| 4,539,590 | 9/1985 | Gage | 348/172 |
| 4,849,906 | 7/1989 | Chodos | 348/171 |
| 5,187,585 | 2/1993 | Kaneda et al. | 348/347 |

FOREIGN PATENT DOCUMENTS 2256988  12/1992  United Kingdom .

OTHER PUBLICATIONS

EPO search report.

*Primary Examiner*—Howard W. Britton
*Attorney, Agent, or Firm*—Ronald P. Kananen

[57] ABSTRACT

An object detecting and tracking apparatus detects a tracking target object from a moving image photographed by a television camera and tracks the same, wherein the movement of the object is detected reliably and with high accuracy to automatically track the target object. When tracking is started after putting the target object in a region designating frame "WAKU" displayed on a screen in such a way as to be variable in size and position, a video signal input from a photographic optical system is Y/C-separated. After that, the target object is specified from a tracking region histogram, and movement vectors are obtained from a color-time-space image, color-time-space differential image, and/or luminance-time-space image thereof, thereby making it possible to more reliably detect even the movement of varied objects as compared with the conventional block matching.

34 Claims, 24 Drawing Sheets

$dw \leq d\varepsilon$ $dw > d\varepsilon$

OBJECT TRACKING APPARATUS

BACKGROUND OF THE INVENTION

1. Field of the Invention

This invention relates to a moving object detecting and tracking apparatus which is suitable, particularly, for tracking a target object by, for example, moving a television camera in accordance with the movement of the target object.

2. Description of the Related Art

Heretofore, when tracking a target object by moving a television camera in accordance with the movement of the target object, the movement of the target object in an image photographed by the television camera is first detected. Block matching is a detection method generally adopted for this movement detection. In block matching, an image inside a frame is divided into a plurality of blocks, and correlative calculation is performed on the target block in relation to the next frame in which it is continuously followed up in terms of time to determine its movement on the basis of a minimum-error block regarded as the corresponding block.

In movement detection by this block matching, matching is effected without isolating the target object from other objects or the background, so that the final judgment is made based on a statistic quantity. That is, if the correct correspondence is not taken, movement determination can be effected by selecting a block involving the minimum amount of errors.

However, in the above-described movement detection method based on block matching, the correlative calculation, which is performed on the target block and the next frame continuously following the same in terms of time, involves a great amount of calculation. Further, there is a problem that a patternized object movement cannot be detected.

In addition, since it only consists of a simple block matching in which movement detection is effected on the basis of the correlation between the target block and the next frame continuously following the same in terms of time, the method cannot cope with any change in the size of the object, the target object not being specified. Thus, even when the object has disappeared from the visual field, the position of minimum correlative calculation will be output as the corresponding block, resulting in an erroneous movement detection.

SUMMARY OF THE INVENTION

In view of the foregoing, an object of this invention is to provide a moving object detecting and tracking apparatus which is capable of accurately and securely detecting the movement of an object to automatically follow the target object.

The foregoing object and other objects of this invention have been achieved by the provision of an object tracking apparatus for tracking a target object within a designated region, comprising: photographing means for photographing an object, and generating a video signal; histogram processing means for calculating the histogram of the above video signal within a designated region on the initial screen; time-space image processing means for obtaining a time-space image with respect to the range having higher frequency of the histogram; and control means for controlling the photographing means based on the locus of the time-space image.

Furthermore, an object tracking apparatus for tracking a target object within a designated region, comprises: histogram processing means for calculating the histogram of a video signal within a designated region on the initial screen; time-space image processing means for obtaining a time-space image with respect to the range having higher frequency in the histogram; and control means for controlling the designating region based on the locus of the time-space image.

When a target object to be tracked is captured within a designation region frame WAKU displayed on a screen in such a way as to be variable in size and position and tracking is started, a video signal input by a photographic optical system 2 is Y/C-separated. After that, the target object is specified from a tracking region histogram, and movement vectors are obtained from the color-time-space image, color-time-space differential image, and/or luminance-time-space image thereof, thereby making it possible to securely detect more varied objects than in the conventional block matching.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First embodiment

Figure 1:
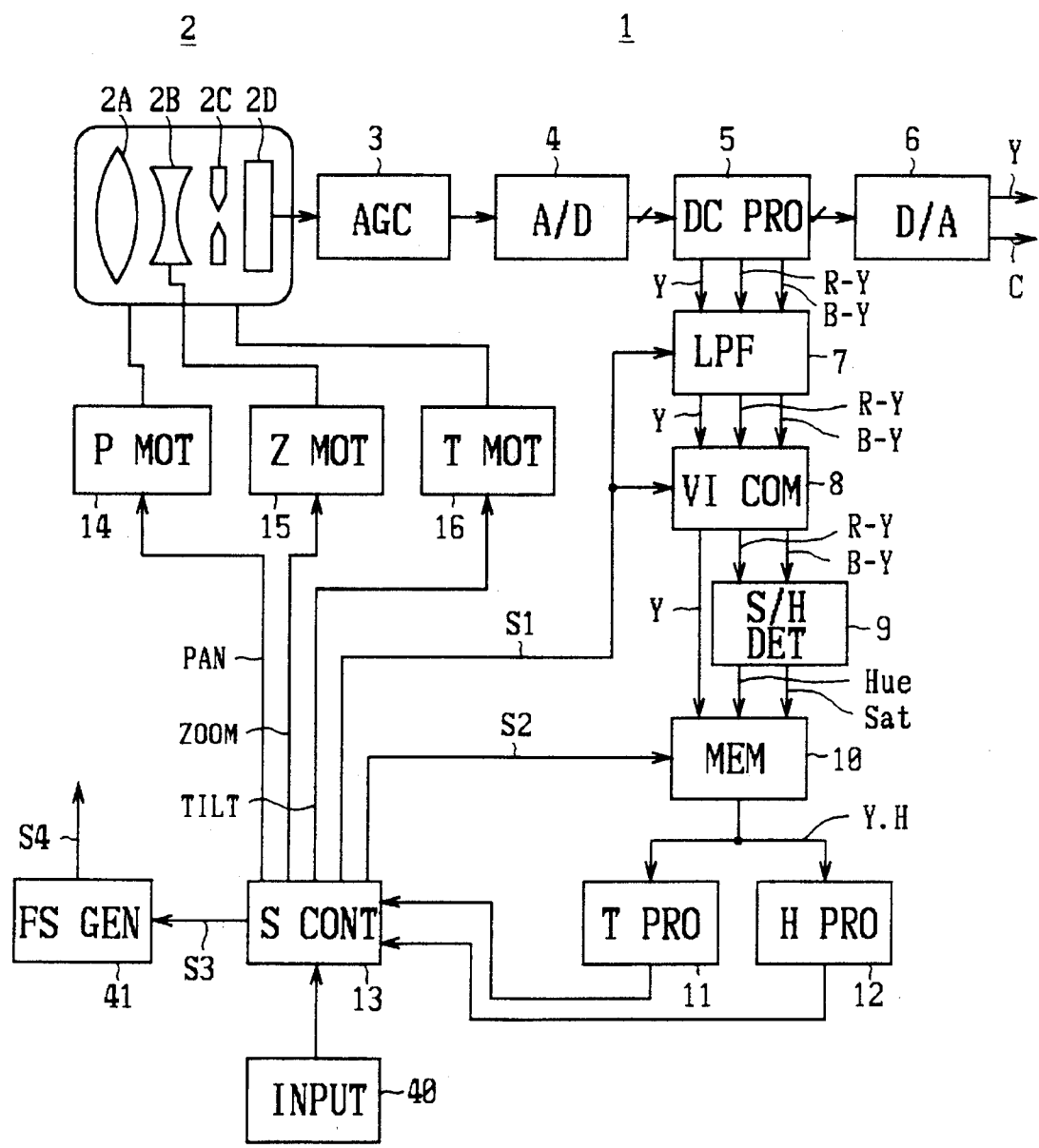
FIG. 1 is a block diagram showing a moving object detecting and tracking apparatus according to the first embodiment of this invention.

FIG. 1 generally shows a moving object detecting and tracking apparatus 1 according to this invention. A video signal from a television camera is output from a photographic optical system 2 including a lens 2A, a zoom lens 2B, an iris 2C, and a CCD image sensing device 2D. The video signal is conveyed through an AGC circuit 3, converted to a digital signal by an analog-to-digital conversion circuit (A/D) 4, Y/C-separated by a digital camera processing circuit 5, and then sent out through a digital-to-analog conversion circuit 6 as a luminance signal Y and a chroma signal C. The luminance signal Y and chroma signal C are supplied to a view finder whom is not shown, to display it.

Further, a luminance signal Y and color difference signals R-Y and B-Y, obtained through Y/C separation by the digital camera processing circuit 5, are transmitted through a low-pass filter (LPF) 7 to undergo image compression by a variable image compression circuit 8. In this process, the luminance signal Y and the color difference signals R-Y and B-Y are thinned out to ¼ or ⅛ to be compressed, in practice, to a size corresponding to 256×256 pixels or a size corresponding to 128×128 pixels. The switching between the sizes is controlled by a control signal S1 from a system control circuit 13 of a microprocessor construction.

Of the luminance signal Y and the color difference signals R-Y and B-Y thus compressed, rectangular-coordinate-system color signals R-Y and B-Y are transmitted through a saturation/hue detection circuit 9 so as to be converted to saturation and hue values as expressed in terms of polar coordinates. The Y-signal, H-signal and S-signal corresponding to one field, thus output, are temporarily stored in a memory 10.

The Y-signal, H-signal, and S-signal, stored in the memory 10, are input to a histogram processing circuit 12 and a time-space image processing circuit 11, and the color and luminance signal histogram inside the region designated for tracking and the x- and y-direction time-space images with respect to the tracking-designated color and x- and y-direction time-space images of the luminance signal are generated. The system control circuit 13 calculates movement vectors and deformation amounts in x- and y-directions from the time-space image in the x- and y-directions with respect to the color.

Further, the system control circuit 13 outputs a panning motor driving signal PAN, a zoom lens motor driving signal ZOOM, and a tilt motor driving signal TILT on the basis of the x- and y-direction movement vectors and deformation amounts thus obtained. A panning motor 14, a zoom lens motor 15, and a tilting motor 16 are operated by these motor driving signals PAN, ZOOM, and TILT, respectively, to automatically track the target object. It is also possible to effect control by focus-locking or AE on the target object. A signal S2 transmitted from the system control circuit 13 to the memory 10 is a memory control signal for region designating frame setting, appropriate change in color region and luminance region deformation, etc. Further, the system control circuit 13 supplies an information S3 of the coordinates and the size of the region designating frame to a frame signal generation portion 41. The frame signal generation portion 41 generates a region designating frame signal S4 on the basis of the information S3. The region designating frame signal S4 is superposed on the luminance signal Y output from the digital-to-analog conversion circuit 6, and displayed with an image photographed to the view finder that is not shown.

Figure 2A:
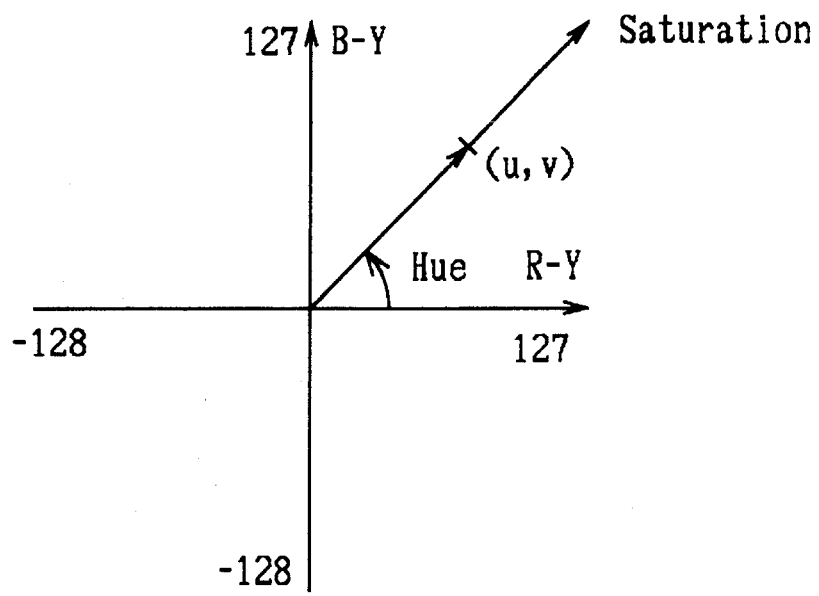
FIGS. 2A and 2B are schematic diagrams explaining a video signal color plane view.
Figure 2B:
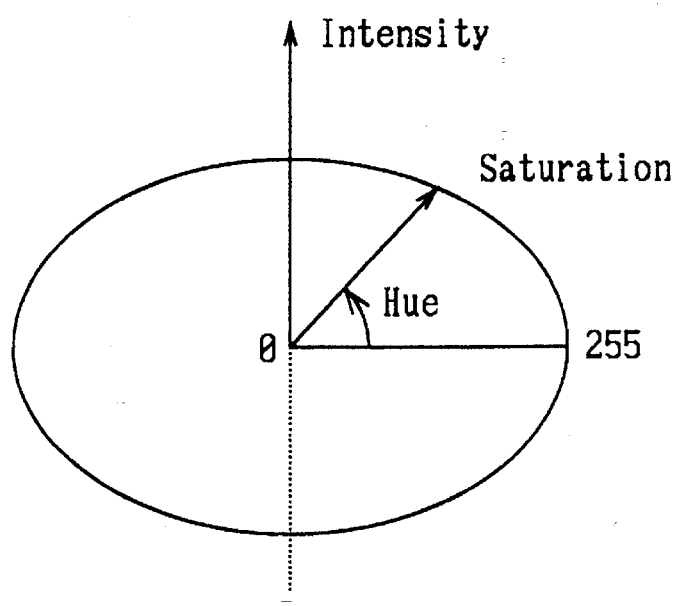
Figure 3:
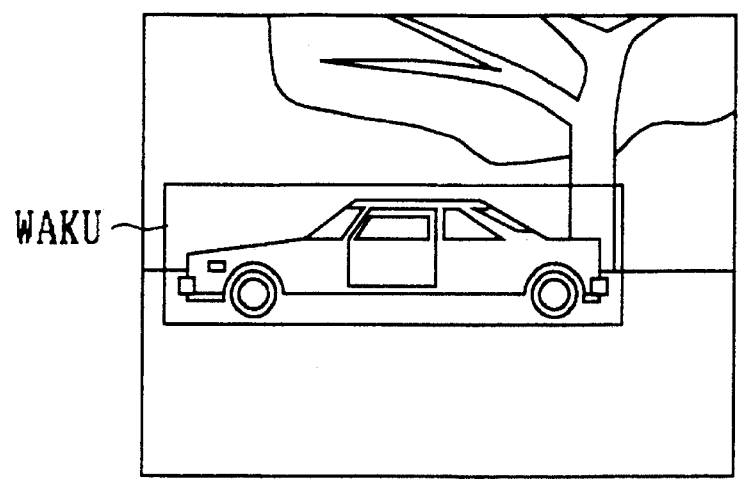
FIG. 3 is a schematic diagram explaining the way a target object is designated in the screen by the region designating frame.

In this embodiment, the saturation/hue detection circuit 9 converts rectangular-coordinate-system color signals R-Y and B-Y to polar-coordinate-system saturation and hue. In practice, the relationship between the rectangular-coordinate-system color signals R-Y and B-Y and the polar-coordinate-system (HSI color model) saturation and hue is expressed as shown in FIGS. 2A and 2B. Note that, "u" shows the value of the R-Y, and "v" shows the value of the B-Y. Here, the rectangular-coordinate-system color signals R-Y and B-Y have a dynamic range of (−128, 127), and the polar-coordinate-system saturation and hue have a dynamic range of (0, 255), which dynamic ranges can be respectively converted by the following equations:

$$\text{saturation } S = \sqrt{(R-Y)^2 + (B-Y)^2} \quad (1)$$

$$\text{hue } H = \tan^{-1} \frac{B-Y}{R-Y} \quad (2)$$

In this embodiment, first, the user moves the region designating frame on the view finder by using a cursor key of an input portion 40 etc., to put the target object to be tracked in the region designating frame. Then, by the user pushes a return key of the input portion 40 etc., the region designating frame is determined in the initial screen. The system control circuit 13 supplies the coordinates and the size of the region designating frame in the initial screen to the memory 10 as the memory control signal S2.

Figure 4A:
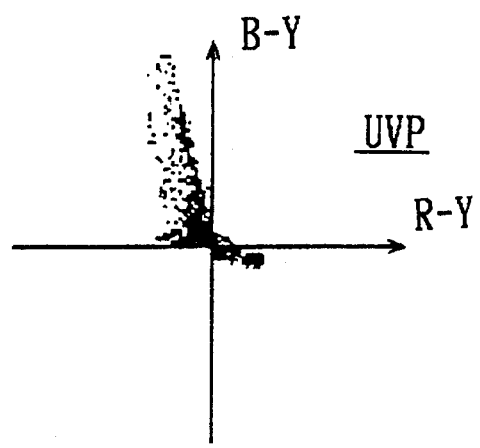
FIGS. 4A to 4C are characteristic curve diagrams explaining the color and saturation of a target object.
Figure 4B:
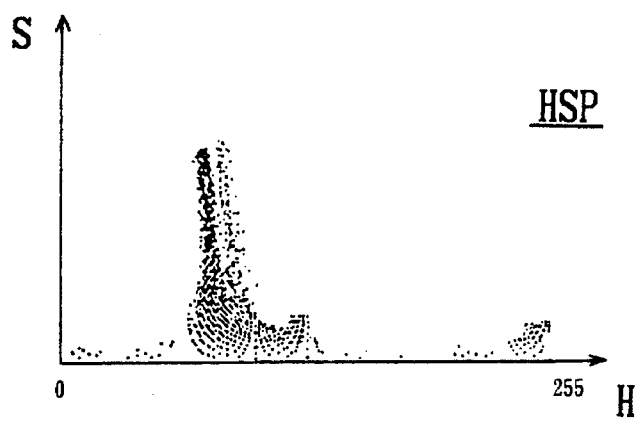
Figure 4C:
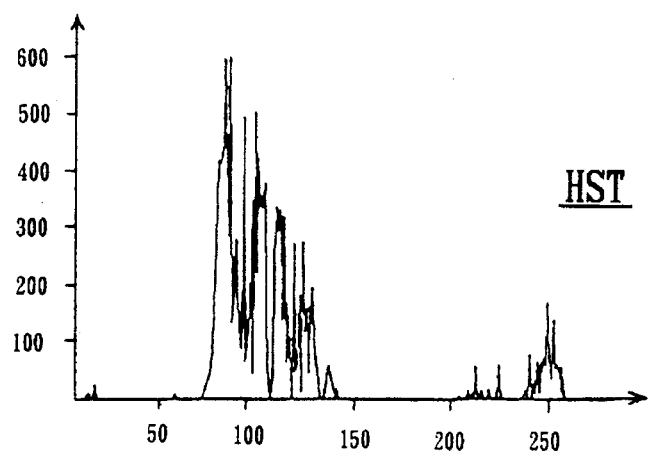

In this embodiment, the target object is a red car within the region designating frame WAKU. For reference, it shows that the color distribution of this region designating frame to FIGS. 4A and 4B. FIG. 4A is in case of showing by the rectangular-coordinate-system, and FIG. 4B is in case of showing by polar-coordinate-system. In this embodiment, the target object is designated by using a hue histogram HST obtained in the histogram processing circuit 12 (FIG. 4C). The color region of the maximum frequency in the hue histogram (FIG. 4C) within the region designating frame WAKU is assumed to be the color of the target object. Here, the maximum range of the color region is restricted to 20, which is suited to approximately 28° when expressed in terms of an angle θ in the polar coordinate system. In practice, if the range of the color region were not restricted, a plurality of colors would be tracked. Thus, in this embodiment, the color region is restricted to the range of the following equation:

$$65 \leq h \leq 85 \quad (3)$$

(here, "h" is the value of Hue)

Figure 5A:
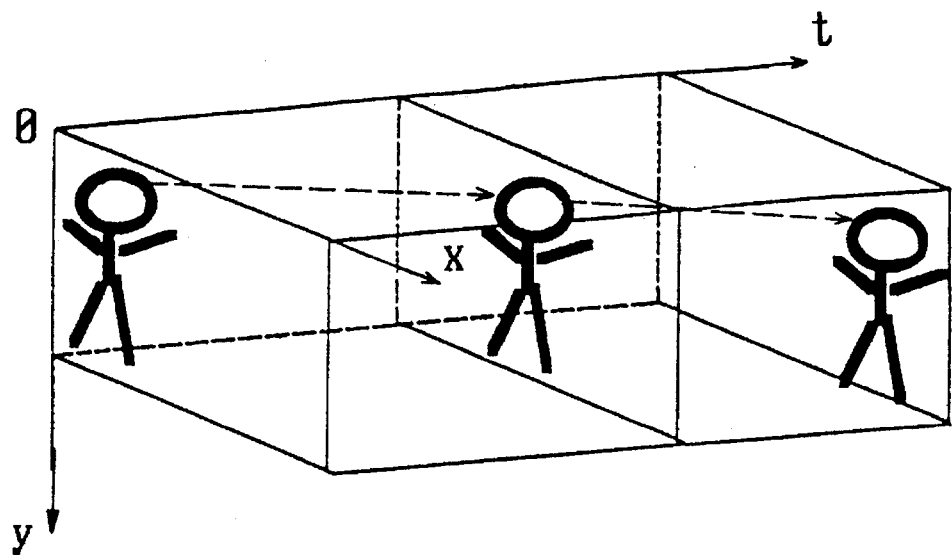
FIGS. 5A to 5C are schematic diagrams explaining the generation of time-space images in the x- and y-directions.

Further, in this embodiment, the time-space image processing circuit assumes a three-dimensional time-space rectangular prism as shown in FIG. 5A with respect to image information, from which prism a time-space image is generated. This time-space image is generally obtained by aligning continuously input images along the time axis to form a three-dimensional time-space rectangular prism, performing calculations of addition and averaging along the x- and y-directions with respect to the three-dimensional rectangular prism at a certain point in time, and arranging the calculation results in the direction of time. In this process, a light/shade-striped pattern appears in the time-space image in accordance with the movement of the camera and the object.

In practice, the value "i" of the luminance signal of respective pixels within the three-dimensional time-space rectangular prism is expressed by the following equation:

$$i = I(x, y, t) \quad (4)$$

On the contrary, the hue value "h" and the saturation value "s", of respective pixels within the three-dimensional time-space rectangular prism, are expressed respectively by the following equation:

$$h = H(x, y, t) \quad (5)$$

$$s = S(x, y, t) \quad (6)$$

Figure 5B:
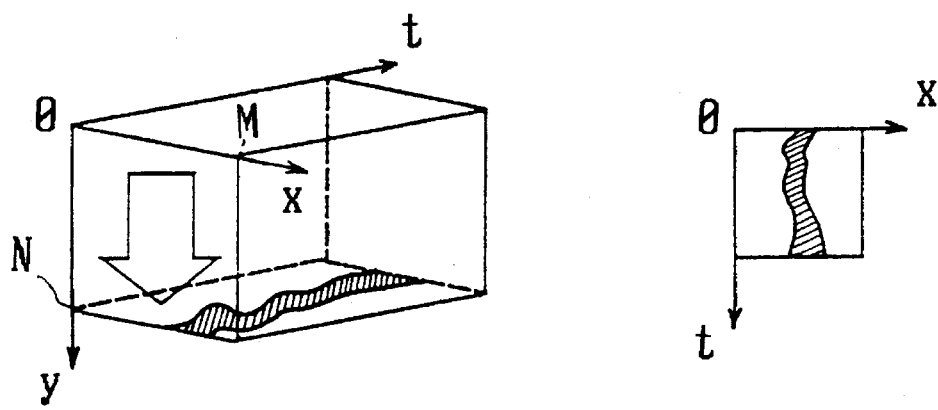
Figure 5C:
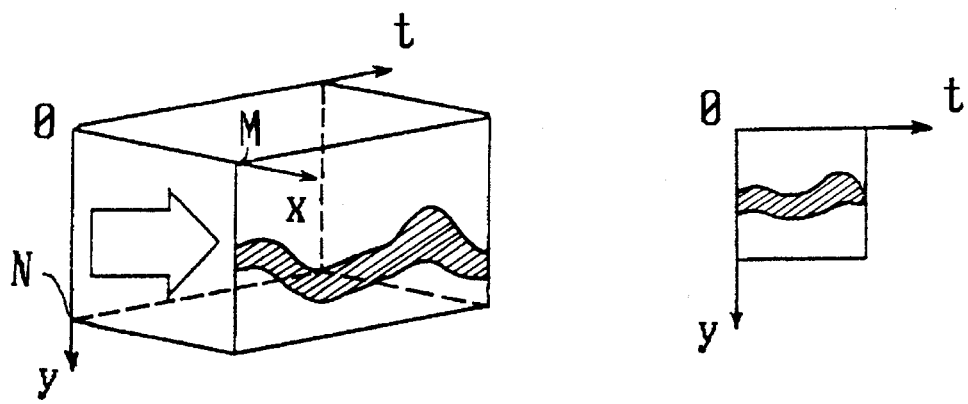

Thereby, from the color region range ($h_1 \leq h \leq h_2$, and in this embodiment, $h_1 = 65$, $h_2 = 85$), which is determined through color determination on the target object, the color-time-space image (Hue) is obtained, as shown in FIGS. 5B and 5C, by the following equation with respect to the x-direction:

$$H(x, t) = \frac{1}{a} \sum_{y=0}^{N} H(x, y, t) \quad (7)$$

(when $h_1 \leq h \leq h_2$, h=h, and when $h < h_1$ and $h > h_2$, h=0, here, "a" is the number of "h"s of h≠0)

and by the following equation with respect to the y-direction:

$$H(y, t) = \frac{1}{b} \sum_{x=0}^{M} H(x, y, t) \quad (8)$$

(when $h_1 \leq h \leq h_2$, h=h, and when $h < h_1$ and $h > h_2$, h=0, here, "b" is the number of "h"s of h≠0)

Figure 6:
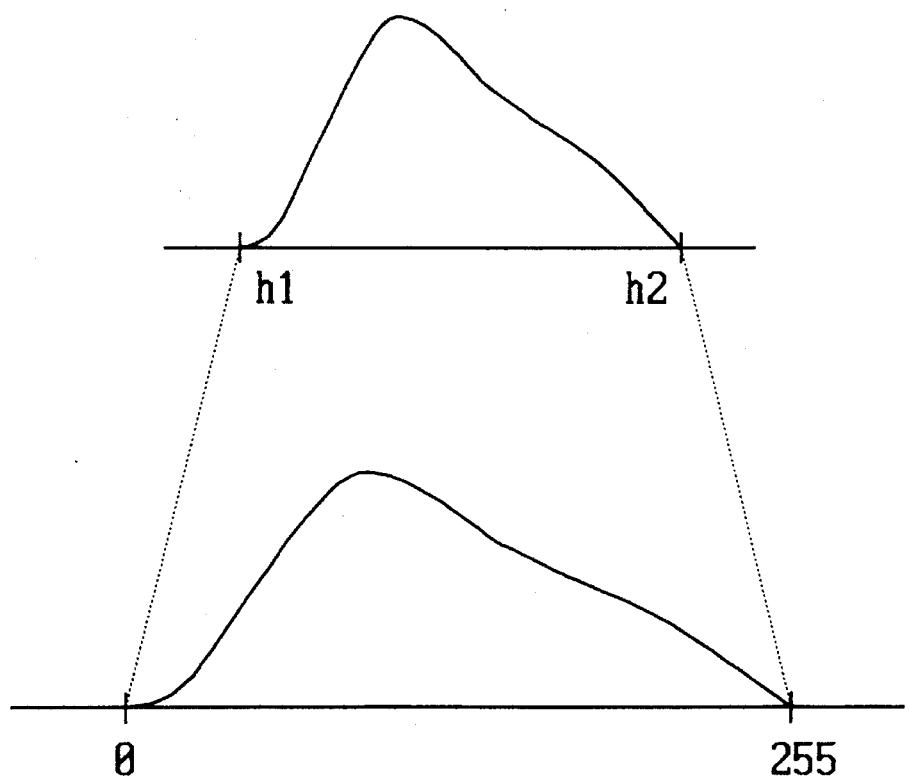
FIG. 6 is a characteristic curve diagram explaining the determination of a color range.
Figure 7A:
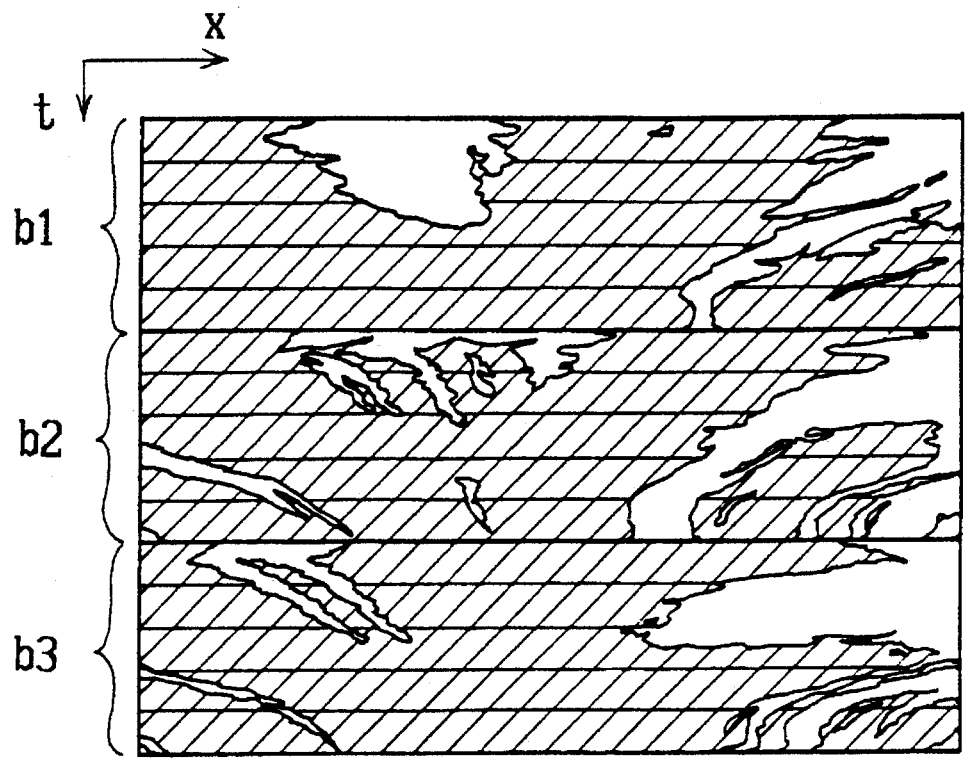
FIGS. 7A and 7B are schematic diagrams showing examples of time-space images generated.
Figure 7B:
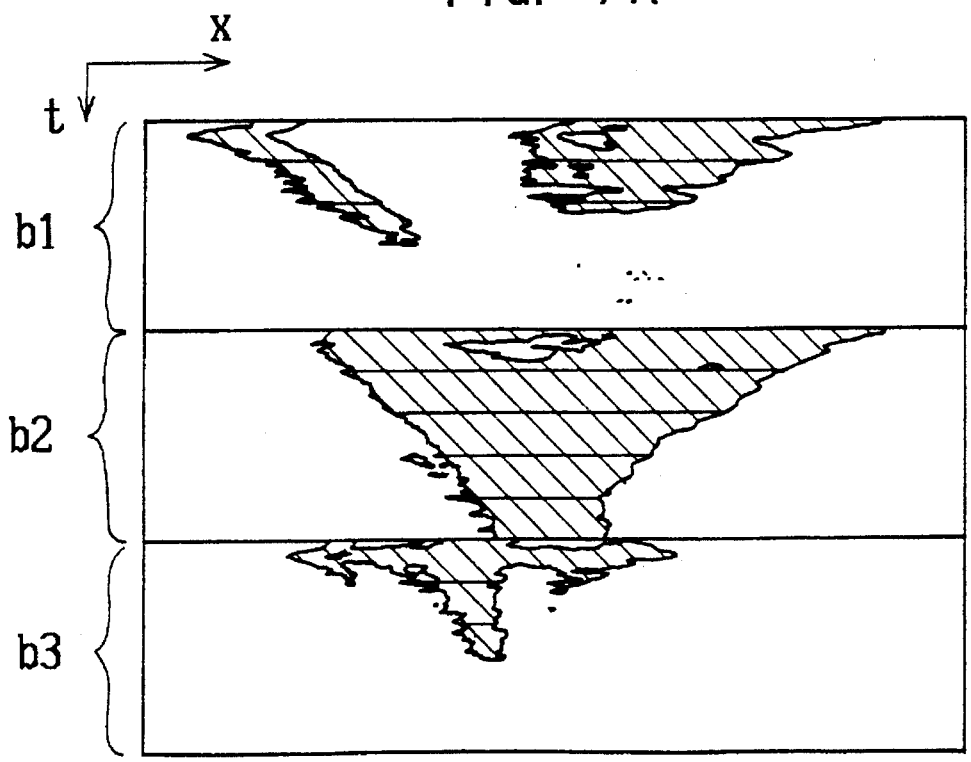

The color-time-space image at each point in time thus obtained is standardized in terms of color region range, as shown in FIG. 6. In this embodiment, no time-space image based on a luminance signal is used. The time-space images thus obtained are presented as shown in FIGS. 7A and 7B. FIG. 7A shows a time-space image based on luminance signals, and FIG. 7B shows a time-space image based on color signals. In this example, the target object consisting of a red car is photographed as it starts to move at a gentle speed, with the camera maintained stationary and the lens widened.

Figure 8A:
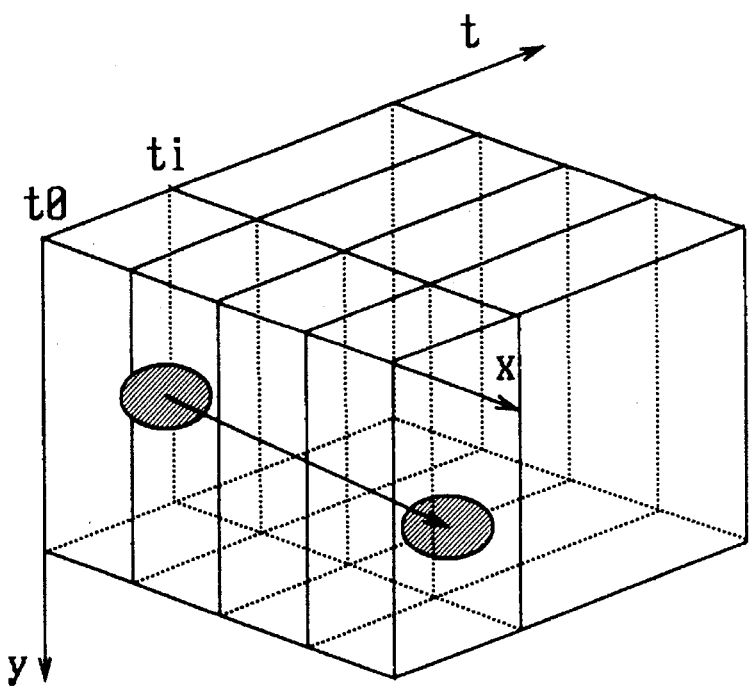
FIGS. 8A and 8B are schematic diagrams explaining the screen region division when generating time-space images.
Figure 8B:
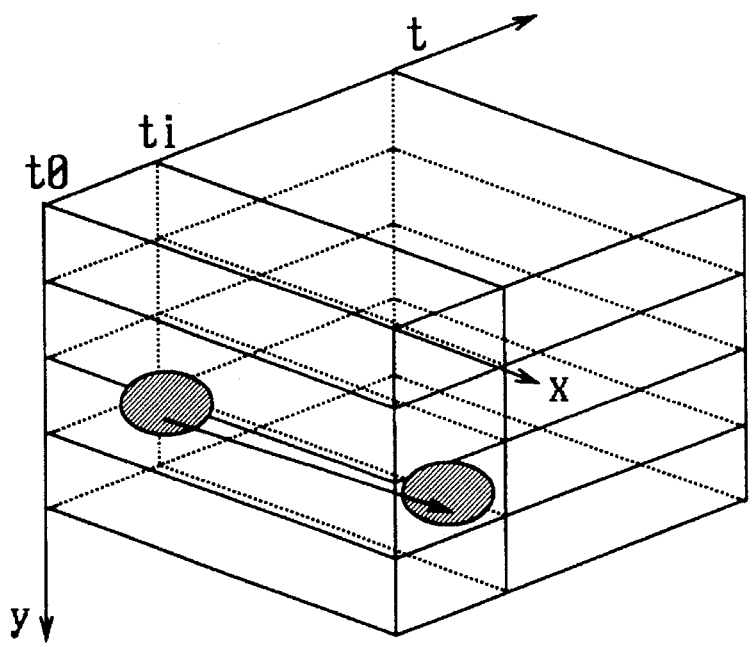

When a time-space image is taken with the entire screen, the information amount is excessively compressed, thereby making it difficult to obtain the correct results. Thus, in practice, the region is divided into eight parts in the x- and y-directions, generating a time-space image in each of the divisional regions. FIGS. 8A and 8B show an example in which the screen is divided into four parts in the x- and y-directions. It is possible to obtain the blocks in which the object currently exists from the position of the designation frame designated or automatically controlled. By using information on these blocks, movement and deformation amounts can be calculated. FIGS. 7A and 7B show time-space images with respect to three of the eight blocks in which the object exists.

Figure 9:
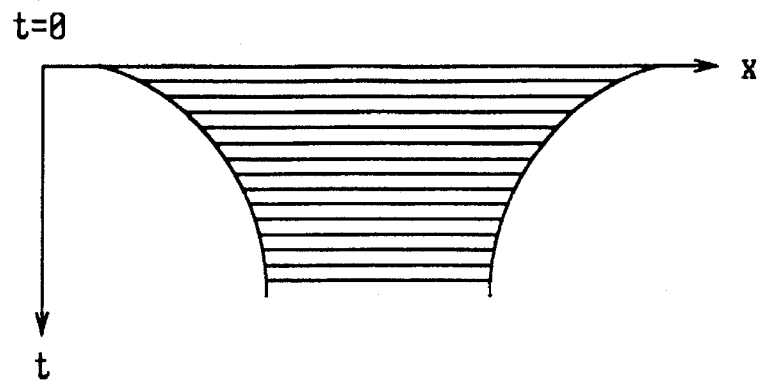
FIGS. 9A to 9C are schematic diagrams explaining movement and deformation amounts in a time-space image.
Figure 9:
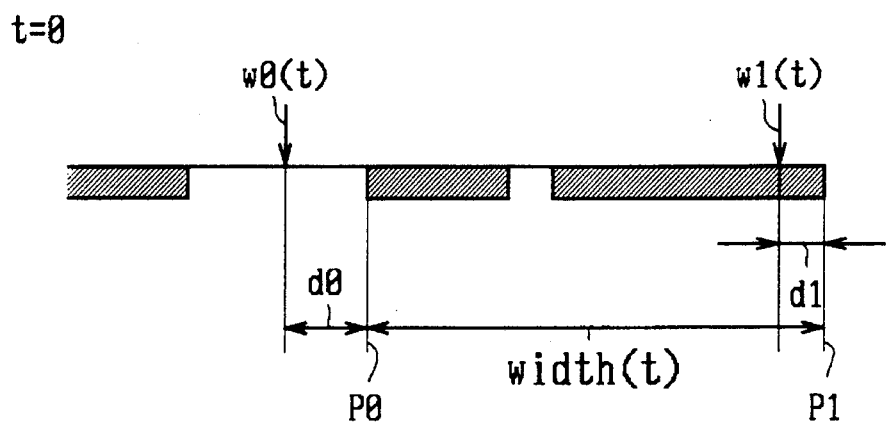
Figure 9:
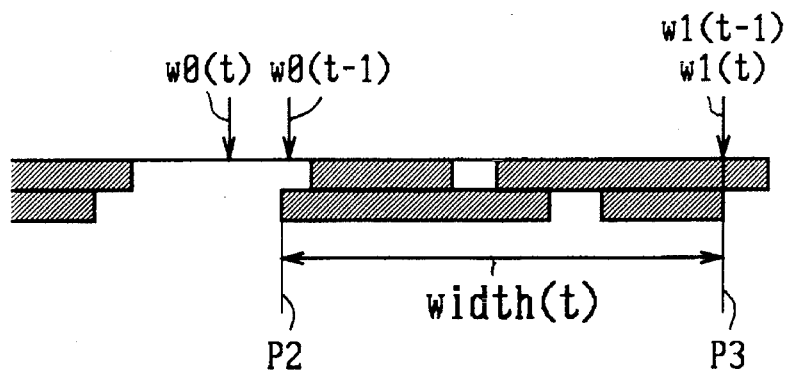

Further, in the moving image detecting and tracking apparatus 1 of this embodiment, procedures as shown in FIGS. 9A to 9C are executed by the system control circuit 13 with respect to the color-time-space image thus obtained, thereby detecting the movement amount and deformation amount of the target object. FIGS. 9A to 9C show processing performed on a time-space-image in the x-direction (FIG. 9A), a similar processing being performed in the y-direction.

First, with respect to the initial screen (t=0, t=t−1 (FIG. 9B), a coordinate region (P0, P1) excluding 0, which is within or extending over the region designating frame coordinates (w0(t), w1(t)) initially set in the color-time-space image, is integrated, and the width thereof (t) which is expressed by the following equation is established as the initial condition of the object:

$$\text{width}(t) = P1 - P0 + 1 \quad (9)$$

As a result of this arrangement, the distances between the coordinates at the ends thereof and the region designating frame, d0(t) and d1(t), are expressed by the following equations:

$$d0(t) = P0 - w0(t) + 1 \quad (10)$$

$$d1(t)=P1-w1(t)+1 \quad (11)$$

(if P0<w0(t), d0(t)=0, and if P1>w1(t), d1(t)=0)
Referring to equations (10) and (11), when P0<w0(t), d0(t)= 0, and when P1<w1(t), d1(t)=0. In practice, the movement amount and the deformation amount are both 0.

Next, with respect to the subsequent screen (t=t in FIG. 9C), a region excluding 0 which is connected with the object width of t=t−1 is obtained, and it is assumed that the end coordinates at that time are (P2, P3). The object width at this time is obtained from the following equation:

$$\text{width}(t)=P3-P2+1 \quad (12)$$

and the deformation amount is obtained from the following equation:

$$R=\text{width}(t)/\text{width}(t-1) \quad (13)$$

Subsequently, on the basis of the deformation amount obtained from equation (13), new region designating frame coordinates are obtained from the following equations:

$$w0(t)=P2-R\times d0(t-1) \quad (14)$$

$$w1(t)=P3+R\times d1(t-1) \quad (15)$$

In this way, it is possible to track the size and movement of the region designating frame. This movement vector can be obtained from the following equation:

$$mv(t) = \frac{w1(t) - w0(t)}{2} - \frac{w1(t-1) - w0(t-1)}{2} \quad (16)$$

Further, from the following equation using a movement vector mvx(t), obtained through processing in the x-direction, the system control circuit 13 generates a panning motor driving signal PAN for controlling the panning motor 14.

$$PAN = A \times mvx(t) \quad (17)$$

Similarly, from the following equation using a movement vector mvy(t), obtained in the y-direction, it generates a tilt motor driving signal TILT for controlling the tilting motor 16.

$$TILT = B \times mvy(t) \quad (18)$$

Further, on the basis of changes in the size of the region frame, it generates, from the following equation:

$$ZOOM = C \times \frac{w1(t) - w0(t)}{w1(t-1) - w0(t-1)} \quad (19)$$

a zoom lens driving signal ZOOM for controlling the zoom lens motor 15. In equations (17) through (19), the coefficients A, B and C are values depending upon the camera condition.

In the embodiment described above, the moving vectors in the x- and y-direction and the size of the frame are detected from a new region designating frame coordinates, to drive the panning motor 14, the tilting motor 16, and the zooming motor 15. However, only moving of the region designating frame, magnifying, or reduction can be performed without driving such a photographing optical system 2. In this case, the system control circuit 13 supplies information of a new region designating frame coordinates S3 to the frame signal generating portion 41. The frame signal generating portion 41 updates the region designating frame signal S4 on the basis of the new region designating frame coordinates.

In accordance with the above-described construction, a video signal input from the photographic optical system is Y/C-separated, and then the color of the target object is inferred from a color histogram of the tracking region. A time-space image of that color is obtained in each of the x- and y-directions, and, from its locus and the relative sizes of the width of the locus and the initial width, the movement amounts and deformation amounts in the x- and y-directions are detected, whereby it is possible to realize a moving object detecting and tracking apparatus which is capable of detecting the movement amounts and deformation amounts even of a patternized object with a relatively small amount of calculation as compared with the conventional block matching.

Further, in accordance with the above-described construction, drive signals for controlling the camera lens, the camera body and/or the zoom lens are generated on the basis of the movement amounts and deformation amounts in the x- and y-directions, whereby it is possible to realize a moving object detecting and tracking apparatus which is not only capable of automatically tracking the object but also coping with any change in the size of the object and which can photograph the target object always in a desirable size, thereby attaining a substantial improvement in terms of the facility with which the apparatus can be used.

Further, in the above-described construction, the region designating frame is moved on the basis of the moving amount and the deformation in the x- and y-directions, and further controlled its size, so as to be track a desired target object. It can be applied to a partial image processing with respect to a target object, or the like.

(2) Second Embodiment

Figure 10:
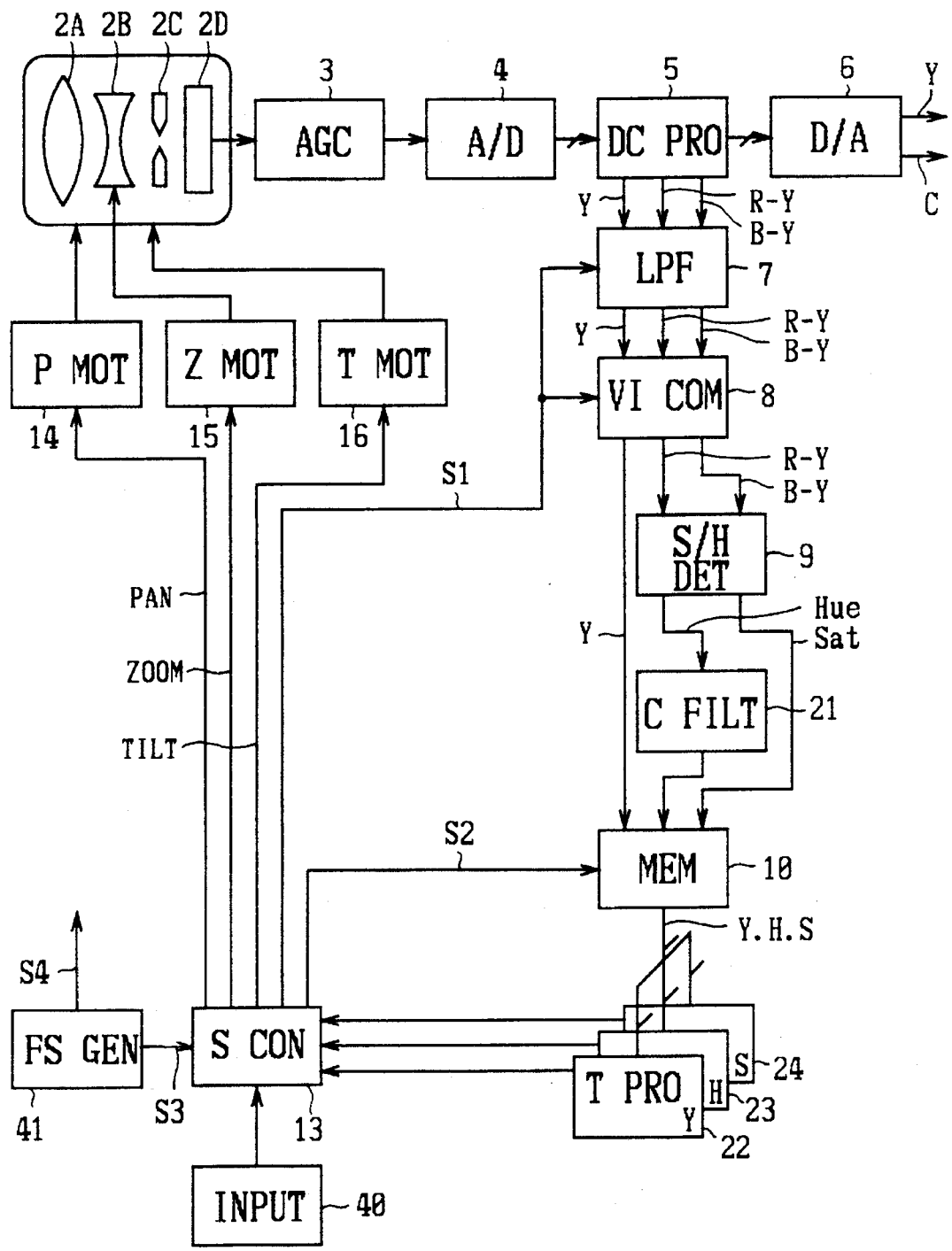
FIG. 10 is a block diagram showing a moving object detecting/tracking apparatus according to the second embodiment of this invention.

Referring to FIG. 10, in which the components corresponding to those of FIG. 1 are indicated by the same reference numerals, numeral 20 generally indicates a moving object detecting and tracking apparatus according to the second embodiment of this invention. In this embodiment, the H-signal consisting of a hue value of the polar-coordinate-system saturation and hue output from the saturation/hue detection circuit 9 is temporarily stored in the memory 10 through a color filter 21.

The Y-signal, H-signal and S-signal stored in the memory 10 are input to their respective time-space image processing circuit 22, 23 and 24, and color and luminance signal histograms of a region frame designated for tracking are obtained, the color of the n-th highest output of the color filter 21 and the luminance range of the maximum frequency being assumed to be characteristics amounts of the target object. Then, time-space images in the x- and y-directions with respect to the color and luminance signals of the target object are obtained.

From these time-space images, the object is specified at the system control circuit 13, and then the movement vectors in the x- and y-directions, condition discrimination, the size, etc. are calculated, and a panning motor driving signal PAN, a zoom lens motor driving signal ZOOM, and a tilt motor driving signal TILT for tracking the target object are output. The panning motor 14, the zoom lens motor 15, and the tilting motor 16 are operated by these motor driving signals PAN, ZOOM, and TILT to automatically track the target object.

Figure 11:
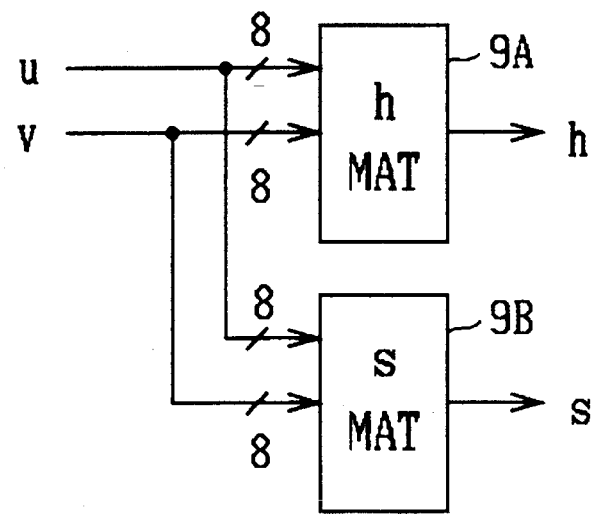
FIG. 11 is a block diagram showing the construction of a saturation/hue conversion circuit.
Figure 12:
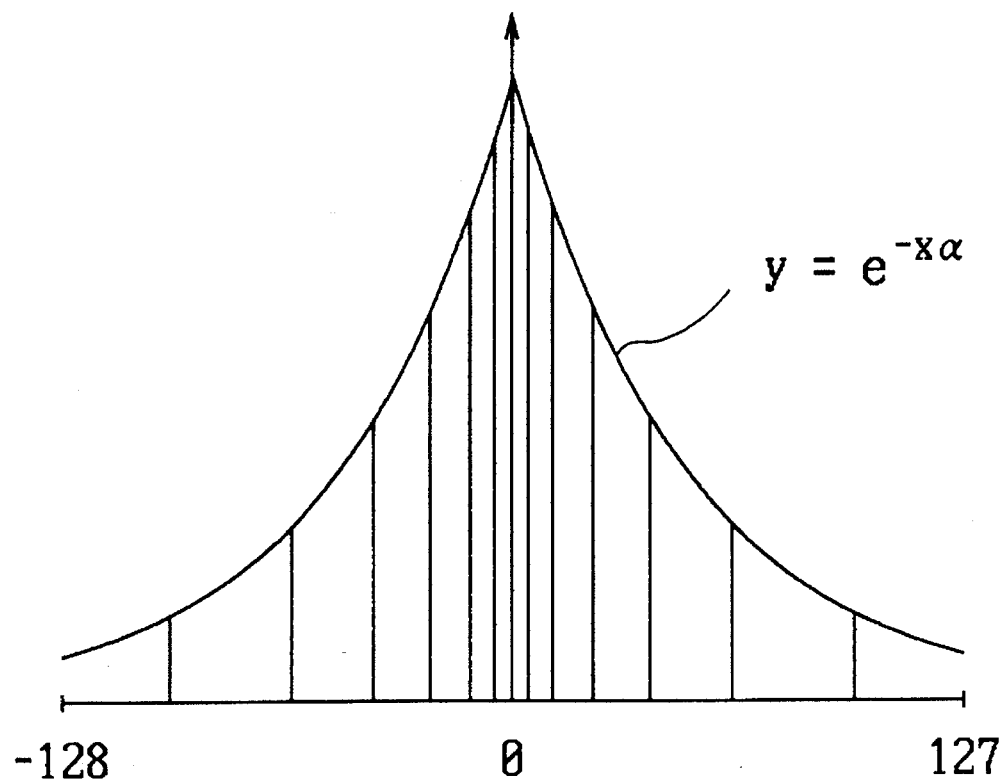
FIG. 12 is a characteristic curve diagram explaining the relationship between color difference signal distribution and quantization step.

In the case of this moving object detecting and tracking apparatus 20, conversion is effected in the saturation/hue detection circuit 9, as shown in FIG. 11, through table look-up from the values of "u" and "v" ("u" and "v" represent the values of R-Y and B-Y respectively) by using h-matrix 9A and S-matrix 9B of a ROM construction. As a table to be used in this process, an exponential function distribution as shown in FIG. 12 is assumed to be the u or v distribution.

Figure 13:
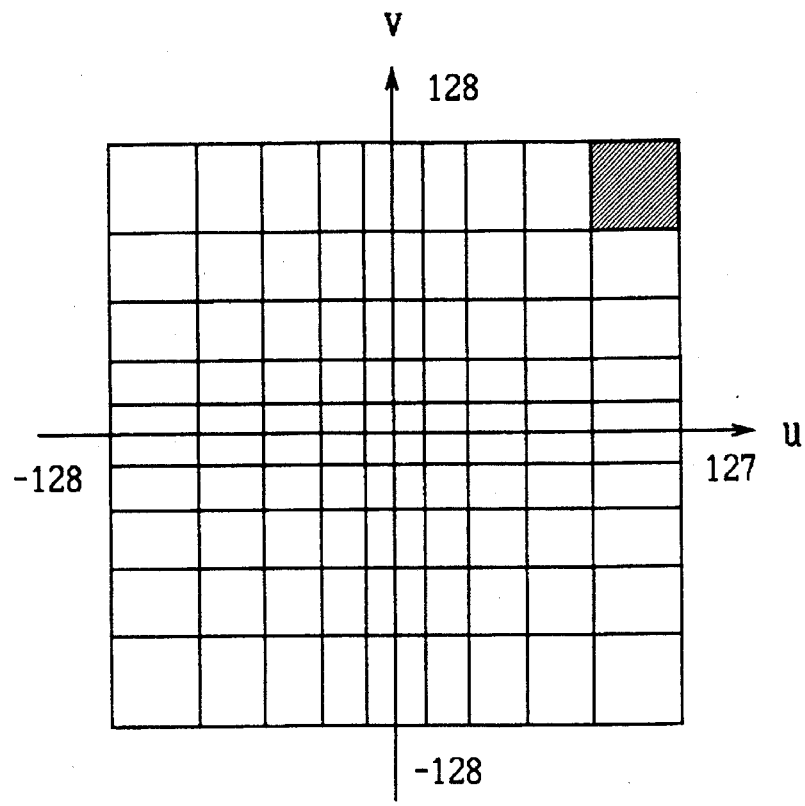
FIG. 13 is a schematic diagram showing the construction of a matrix for converting a color difference signal to saturation/hue.

Then, to reduce the memory capacity, the quantization level number is reduced from 128 to n steps. Two u-v planes thus formed by re-quantized u-and v-axes are prepared for H and S, as shown in FIG. 13. Each section of the conversion map allows calculation beforehand of the in-region average value by equation (1) described above.

Further, in the case of this moving object detecting and tracking apparatus 20, the color filter 21 effects color range restriction with respect to the H-signal obtained from the u- and v-signals obtained by the saturation/hue detection circuit 9, and an integrated value of the histogram in each color range is output.

In practice, the H-signal is determined in its two-dimensional arrangement as shown in the video signal color plane view of FIG. 2A. Thus, color classification is performed in the hue range to construct the color filter 21. Here, the colors undergoing classification were red, blue, green, yellow, cyan, magenta and flesh tint, which are generally found in nature. The color ranges for magenta (Mg), red (R), skin color, yellow (Y), green (G), cyan (Cy) and blue (B) were empirically determined as 20-40, 65-85, 90-110, 115-135, 150-170, 195-215, and 225-245, respectively, as shown FIG. 14.

Figure 15A:
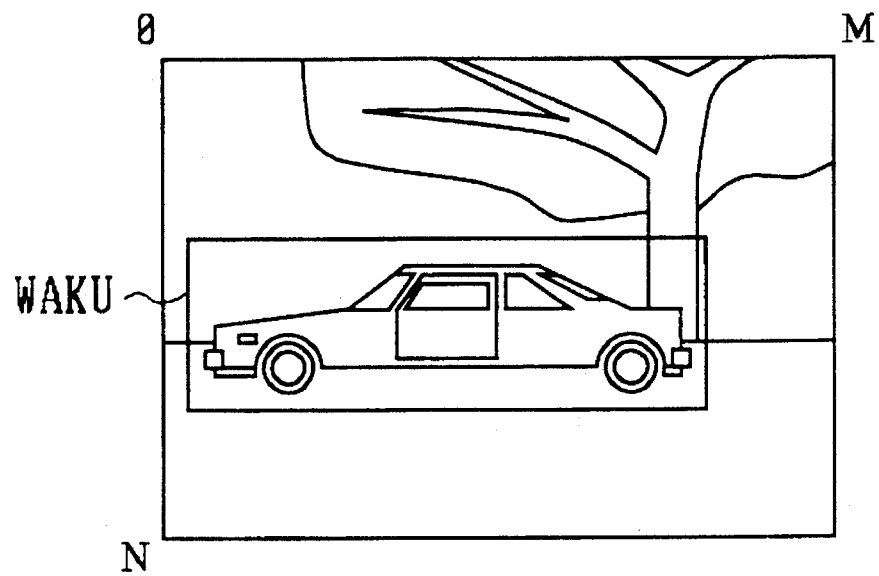
FIGS. 15A and 15B are schematic diagrams explaining the designation of a target object and time-space image calculation ranges.
Figure 15B:
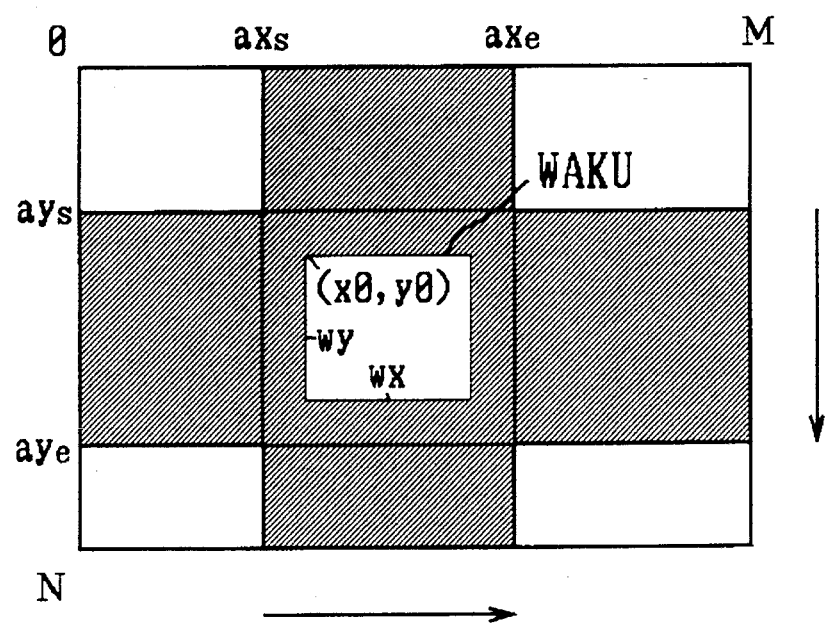

Here, when determining the color of the target object consisting of a red car with respect to an image as shown, for example, in FIGS. 15A and 15B, as the initial image, the color filter 21 is applied to the above-described hue histogram, and the histogram area in each color range is filter-output, assuming the color ranges whose output level is not lower than the n-th highest level (e.g., n=2) to be the colors of the target object. In practice, in this color filter 21, gaps are provided between the colors, by means of which gaps the influence of the neutral tints can be effectively eliminated.

Figure 16:
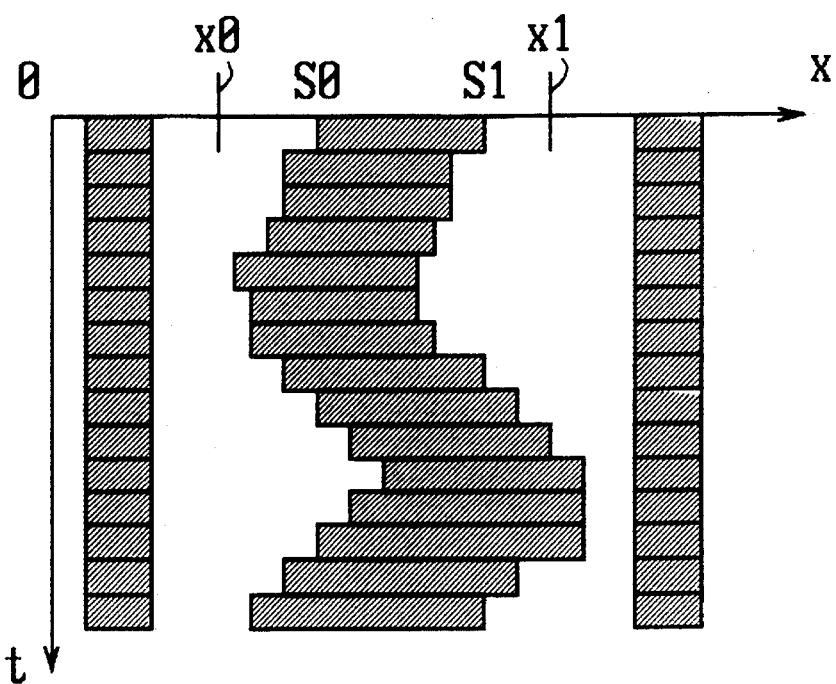
FIG. 16 is a schematic diagram explaining a color-time-space image.

The time-space image is obtained in the same way as in the first embodiment. In this embodiment, however, taking the time-space image with the entire screen results in excessive compression of information amount, which makes it difficult to obtain correct results. Thus, in practice, as shown in FIG. 15B, the image regions in the x- and y-directions are restricted to band-like regions each somewhat wider than the designation region frame, and a time-space image as shown in FIG. 16 is obtained in the region.

Further, in the case of this embodiment, the system control circuit 13 is designed to obtain a time difference with respect to the color-time-space image thus obtained. Due to this arrangement, the still portion in the color-time-space image is deleted, and only information on the portion which has undergone any change is extracted. In this process, slight movement and edge portions are extracted as noises, so that the shift regions smaller than a certain size are removed from the differential image.

Figure 17:
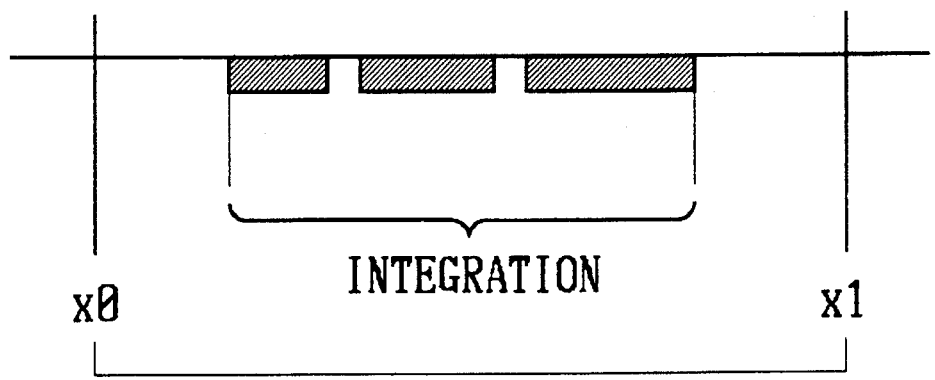
FIG. 17 is a schematic diagram explaining the specification of a target object.

In the above-described construction, when actually starting the tracking of a target object, it is necessary in the first place to inform the system of the object that the photographer intends to track. Thus, as shown in FIG. 15A, the object to be tracked is determined in the initial screen with the region designating frame WAKU the same as the case of the first embodiment, before starting the tracking. By this arrangement, the position of the target object can be known, as shown in FIG. 17, from the end coordinates X0, X1 in the x- and y-directions of the region designating frame WAKU.

Thereby, this range is regarded as the region where searching is to be performed, and the coordinates (s0, S1) of the characteristics amounts within this range are obtained from the color-time-space image and the color-time-space differential image in the initial screen. If they satisfy the conditions of the following equation:

$$x0 \leq s0 \leq x1 \qquad (20)$$

$$x0 \leq s1 \leq x1 \qquad (21)$$

it is judged to the target object. Or, when a plurality of characteristics exist in a split state in the region designating frame, integration is effected if the interval thereof is smaller than a certain value, and regarded as the same object.

Figure 18A:
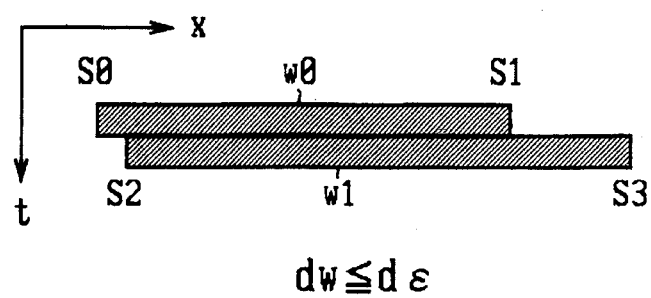
FIGS. 18A and 18B are schematic diagrams explaining the detection of the size of a target object.
Figure 18B:
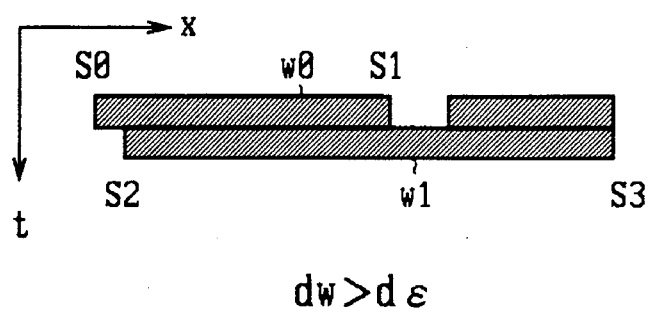

Further, from the coordinates of the target object specified in the initial condition, the way the object moves is examined by utilizing time continuity, as shown in FIGS. 18A and 18B. Suppose the coordinates of the object in the initial condition t0 are (S0, S1). The coordinates (S2, S3) at time t1 subsequent thereto are obtained. Here, the size of the object is expressed by the following equations:

$$t=0 \ w0=s1-s0+1 \qquad (22)$$

$$t=1 \ w1=s3-s2+1 \qquad (23)$$

The difference in size dw at this time is expressed by the following equation:

$$dw=|w0-w1| \qquad (24)$$

(when $dw \leq d\epsilon$, $w1=w1$, and when $dw > d\epsilon$, $w1=w0$, here, "$d\epsilon$" is a predetermined constant)

whereby the size of the object is determined.

Figure 19A:
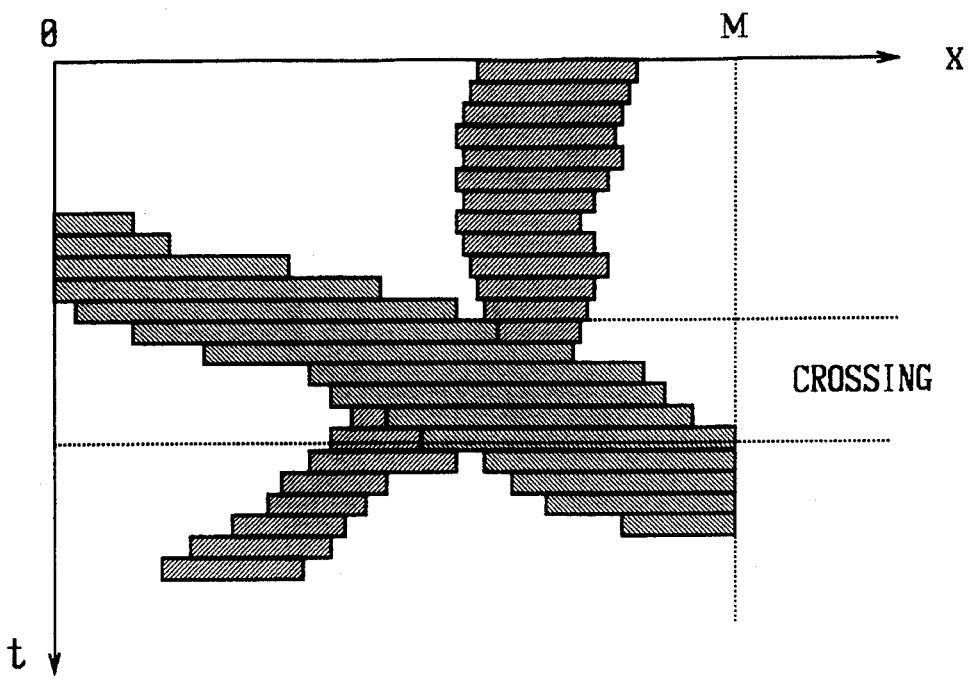
FIGS. 19A and 19B are schematic diagrams explaining crossing of a target object with another object in time-space image.
Figure 19B:
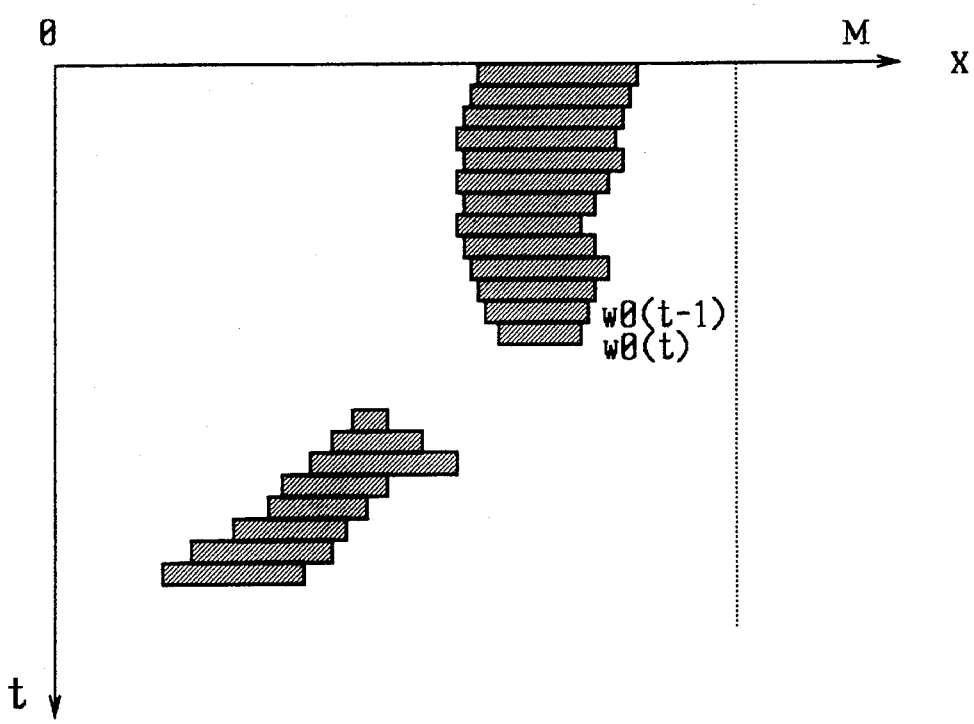

Further, in this embodiment, any crossing of the target object with another object or its disappearance from the screen is detected. In practice, crossing of the target object with another object results in a time-space image as shown in FIG. 19A, from which it can be seen how the width of the object is gradually hidden by another object. By utilizing this change in object width, the crossing condition can be inferred. When the object to be tracked is specified in terms of color, the color locus of the tracked object is interrupted in between as shown in FIG. 19B.

Figure 20:
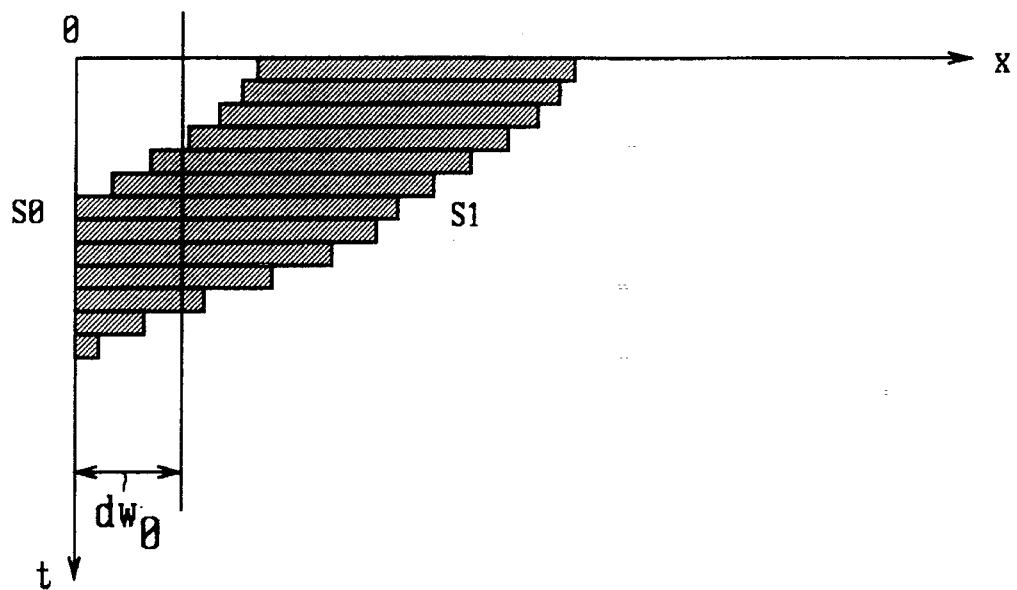
FIG. 20 is a schematic diagram explaining disappearance of a target object from the screen in a time-space image.

Further, when the object has disappeared from the screen, the movement locus of the time-space image is interrupted, so that the tracking cannot be performed with the same algorithm as the one which has been used. Thus, it is necessary to make a judgment as to whether disappearance of the target object from the screen has occurred or not. FIG. 20 shows the way disappearance from the screen occurs in the time-space image. Suppose the coordinates of the object are (S0, S1) and the screen width is "width". When the coordinates of the object satisfy the following formula:

$$s0=0, \ s1 < dw0, \text{ and } (s1-s0+1) < dw \qquad (25)$$

(here, "dw0" is a predetermined constant)
or $$s0 > dw1, \ s1=\text{width}-1, \text{ and } (s1-s0+1) < dw \qquad (26)$$

(here, "dw1" is a predetermined constant)
disappearance of the object from the screen is judged to be occurring.

Figure 21:
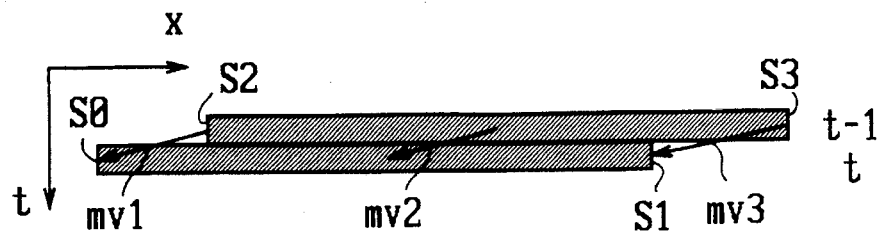
FIG. 21 is a schematic diagram explaining the detection of movement vectors by means of a color-time-space image.
Figure 22:
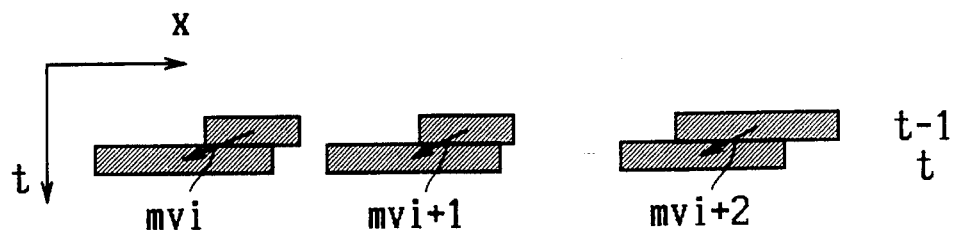
FIG. 22 is a schematic diagram explaining the detection of movement vectors by means of a color-time-space differential image.

Further, in the system control circuit 13 of this embodiment, movement vector detection is performed by means of a color-time-space image. In practice, it is assumed, as shown in FIG. 21, that the end coordinates of a specified object in the color-time-space image at a certain point in time are (S0, S1), and that the end coordinates characteristically following the coordinates (S0, S1) at the point in time t−1 are (S2, S3). It is assumed that the movement vectors obtained from the end coordinates and the center coordinates by utilizing this continuity are mv1, mv2 and mv3. Further, as shown in FIG. 22, movement vectors are obtained from the time continuity of all the edges existing in the region designating frame in the color-time-space differential image. Here, movement vectors mvi through mvj are assumed with respect to all the edges existing within the frame.

Figure 23:
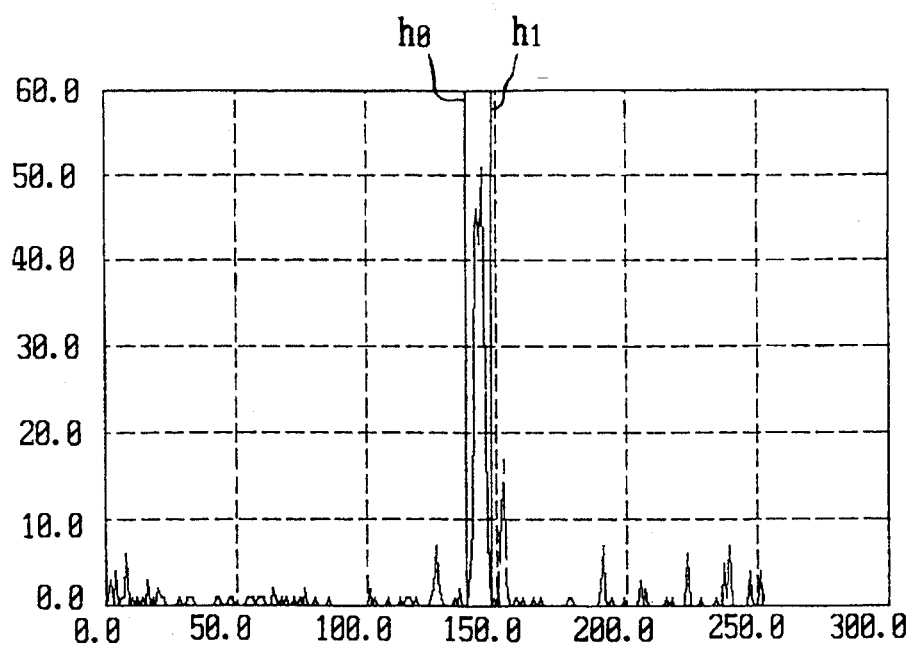
FIG. 23 is a characteristic curve diagram explaining a luminance histogram.

Here, as shown in FIG. 23, a luminance histogram inside the region 21 designating the target object is taken, and a portion exhibiting an offset in frequency is determined as the luminance range ($h_0$, $h_1$) of the target object. Subsequently, as in the case of the color signals, an average value is obtained with respect to this luminance range ($h_0$, $h_1$), and, from the following equations for the x- and y-directions, $$i = I(x, y, t) \quad (27)$$

$$I(x, y) = \frac{1}{N} \sum_{y=0}^{N} H(x, y, t) \quad (28)$$

$$I(y, t) = \frac{1}{M} \sum_{x=0}^{M} H(x, y, t) \quad (29)$$

a luminance-time-space image is generated. As in the case of the color-time-space image, the calculation range is the band-like ranges as described with reference to FIG. 15B.

Figure 24:
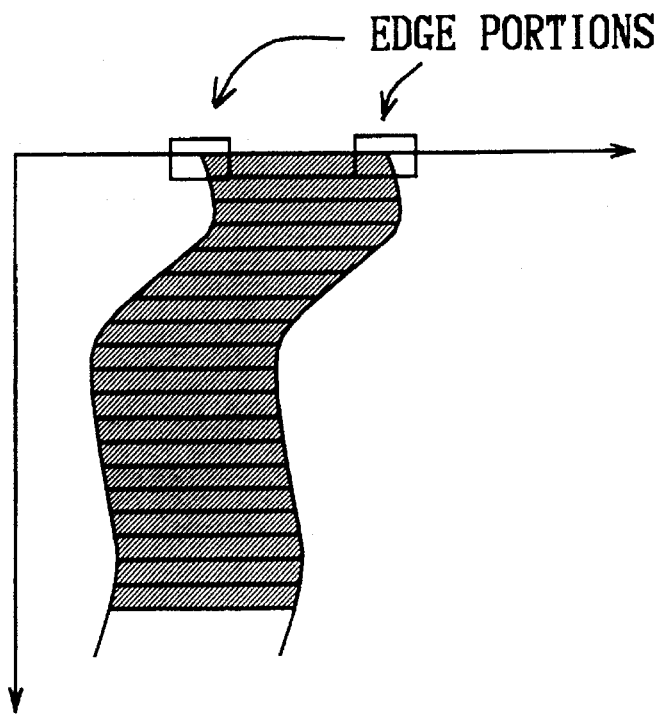
FIG. 24 is a schematic diagram explaining movement vector detection by means of a luminance histogram.

Subsequently, an edge portion is detected with respect to the characteristics in the region designating frame of the luminance-time-space image obtained as shown in FIG. 24. Then, pattern matching is performed on small regions including that edge. The region exhibiting correlativity to the largest degree is regarded as the corresponding region, and movement vectors are calculated. Here, movement vectors mvk–mvl are obtained with respect to all the edges inside the region designating frame.

Figure 25:
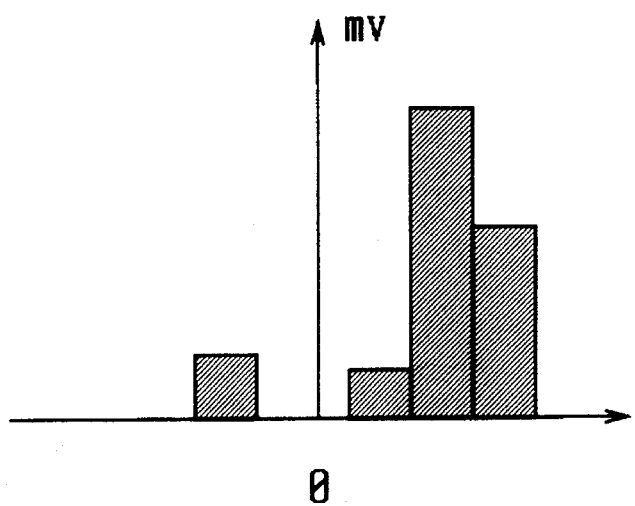
FIG. 25 is a histogram illustrating a movement vector histogram.

The movement vectors mv1, mv2, mv3, mvi to mvj, and mvk to mvl, obtained from the color-time-space image, the color-time-space differential image and the luminance-time-space image, respectively, are synthetically judged. From a movement vector histogram obtained from these movement vectors as shown in FIG. 25, the movement amount of the maximum frequency is determined as the movement vector at that time.

In accordance with the above construction, a video signal input from the photographic optical system is Y/C-separated, and then the target object is specified from a tracking region histogram. From the color-time-space image, the color-time-space differential image and the luminance-time-space image thereof, movement vectors are obtained, and, through decision by majority, the movement vector is determined, whereby it is possible to realize a moving object detecting and tracking apparatus capable of securely detecting even the movement of a patternized object with a reduced amount of calculation as compared with the conventional block matching.

Further, in accordance with the above-described construction, the amount of information involved is smaller than in the conventional block matching, so that the calculation amount can be reduced, thereby realizing an increase in processing speed and achieving a reduction in memory capacity. Further, since compressed characteristics amounts are used, it is possible to perform movement amount calculation without being affected by the configuration of the object, the peculiarity in its pattern, etc. Since tracking is started after specifying the target object, an erroneous tracking can be effectively prevented even when the object has disappeared from the visual field.

Further, in accordance with the above-described construction, driving signals for controlling the camera lens, the camera body and/or the zoom lens are generated on the basis of movement amounts and deformation amounts in the x- and y-directions, whereby it is possible to automatically cope with any change in the size of the object as well as to automatically track the object. Thus, a moving object detecting and tracking apparatus can be realized which is capable of always photographing the target object in a desired size, thereby achieving a substantial improvement in terms of convenience in use.

Further, in the embodiment described above, on the basis of the moving amount and deformation in the x-and y-directions, the photographing optical system 2 is controlled. However, this invention is not only limited to this, but may move, magnify, or reduce the region designating frame same as the case of the first embodiment. In this case, coordinates of a new region designating frame can be obtained from the moving vector in the x- and from y-directions and the width of the color-time-space image.

(3) Third Embodiment

Figure 26:
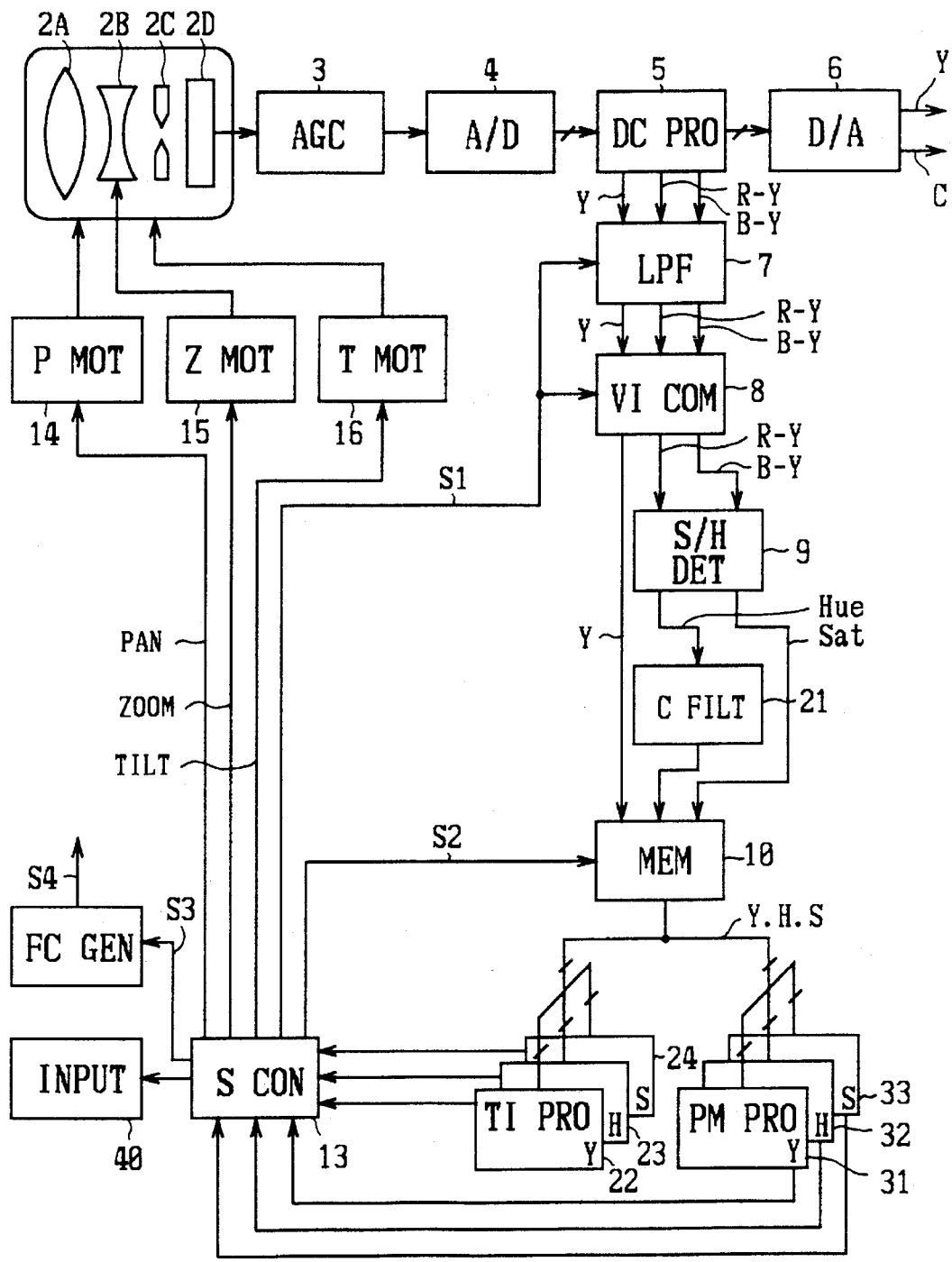
FIG. 26 is a block diagram showing a moving object detecting/tracking apparatus according to the third embodiment of this invention.

Referring to FIG. 26, in which the components corresponding to those of FIGS. 1 and 10 are referred to by the same reference numerals, numeral 30 generally indicates a moving object detecting and tracking apparatus according to the third embodiment of this invention. Y-signal, H-signal, and S-signal stored in the memory 10 are input to the time-space image processing circuits 22, 23 and 24, respectively. For performing tracking with respect to these Y, H and S-signals, color and luminance signal histograms in the designation region frame are obtained, and, further, time-space images in the x- and y-directions are obtained with respect to the colors of not smaller than the n-th largest output of the color filter 21. The time-space image obtained here is subjected to characteristics discrimination at the system control circuit 13 for a judgment as to whether it is the color of the target object or not.

Then, the coordinates of the target object are determined by using that time-space image, and segmentation is performed in a two-dimensional space. From this onward, calculation of movement vectors in the x- and y-directions, condition discrimination, and size calculation are performed by utilizing the time continuity of the color-time-space image of the target object determined, and a panning motor driving signal PAN, a zoom lens motor driving signal ZOOM, and a tilt motor driving signal TILT for tracking the target object are output. The panning motor 14, the zoom lens motor 15, and the tilting motor 16 are operated by these motor driving signals PAN, ZOOM and TILT, respectively, thereby making it possible to automatically track the target object.

Further, in the case of this embodiment, the system control circuit 13 performs detection of the condition of the target object, such as its disappearance from the screen or its temporary disappearance as a result of crossing with another object, size judgment, segmentation in a two-dimensional space, etc. When the target object is judged to have disappeared, the pattern matching circuits 31, 32, and 33 perform matching by using the two-dimensional pattern of the object prior to its disappearance by means of the Y-signal, H-signal, and S-signal to make a judgment as to whether the object has re-appeared on the screen or not. If it has re-appeared, tracking can be started again.

In the moving image detecting and tracking operation according to this embodiment, separation of the target object from the background, specification of the target object, etc. are conducted on the assumption that the system is started after the target object that the user intends to track has been designated by the region designating frame on the initial screen, same as cases of the first and second embodiments. As shown in FIG. 15A and 15B, it is assumed that the input image size is expressed as (M, N), the coordinates of the left upper end point of the window of the region designating frame WAKU are (x0, y0), and the window size of the region designating frame WAKU is (wx, wy).

Figure 14:
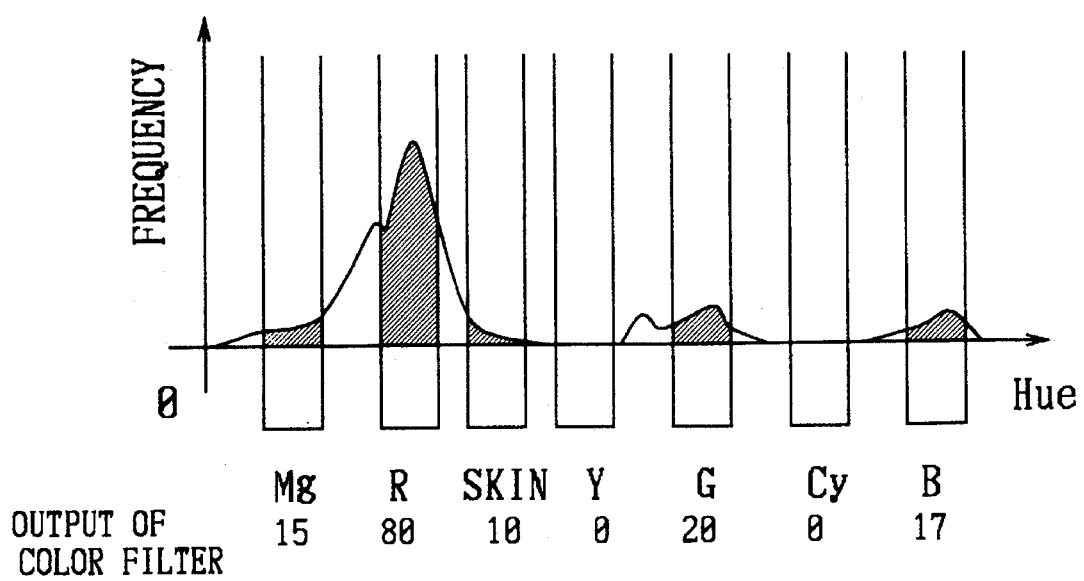
FIG. 14 is a characteristic curve diagram explaining a color filter.

FIG. 15A shows the initial condition of the system when the target object has been designated by the region designating frame WAKU. The target object in this example is a red car. Here, in the image at the point in time, t=0 (the initial screen), the above-described color filter of FIG. 14 is applied to the hue histogram in the region designating frame WAKU, and the histogram area of each color range is regarded as a filter output, preparing time-space images with respect to the color ranges corresponding to the colors of not smaller than the n-th largest output (e.g., n=2) of the filter.

Suppose the time-space image generated is H(x, t0). It is assumed that in this time-space image H(x, t0, the point at which a change occurs from H(x, t0)=0 to H(x, t0)>0 is xsi, and the point at which a change occurs from H(x, t0)>0 to H(x, t0)=0 occurs is xei. Here, the range expressed as (xsi, xei) exhibits characteristics. That is, the object of the color region range (h$_1$, h$_2$) exists at this position. If they exhibit a relationship as expressed by the following equation:

$$xs_{i+1} - xe_i < \epsilon_x \quad (30)$$

Figure 27A:
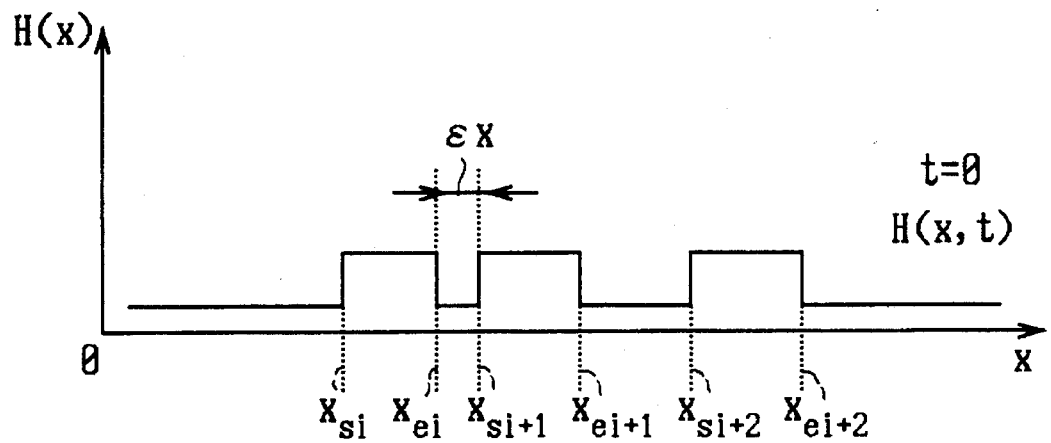
FIGS. 27A and 27B are schematic diagrams explaining the specification of a target object.

(here, "$\epsilon_x$" is a predetermined constant)
i and i+1 are integrated (FIG. 27A).

Figure 27B:
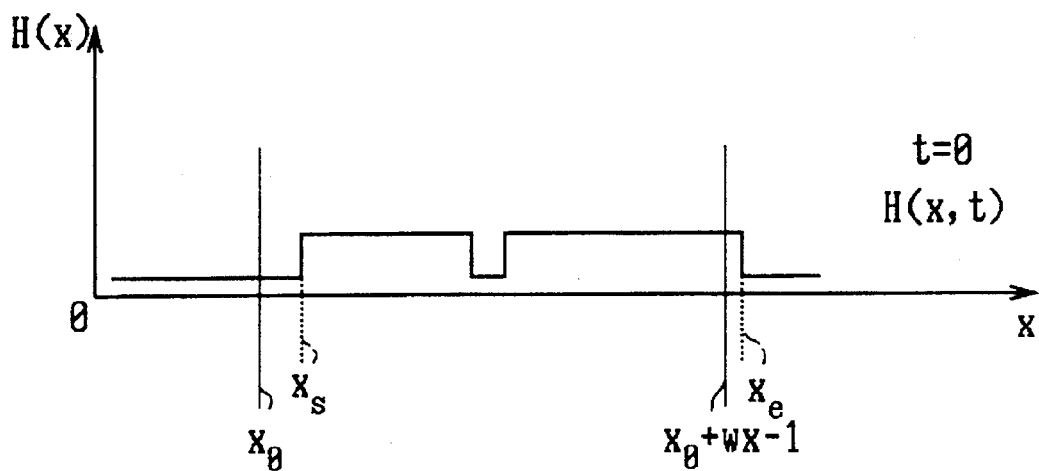

In the coordinates thus obtained, the coordinates (xs0, xe0) related to the end coordinates of the window, as shown in FIG. 27B, are determined as the target object. Similarly, the coordinates (ys0, ye0) of the target object are determined from the y-direction window coordinates (y0, y0+wy−1). If at this time the relation ship of the following equation:

$$xe_0 - xs_0 > \frac{M}{2} \quad (31)$$

holds true, the color exists over the entire screen, so that the color is judged to be the background color. Otherwise, it is judged to be the color of the target object, and tracking is started by using this color-time-space image. Here, the coordinates (xs0, xe0) and (ys0, ye0) are stored as the initial coordinates of the target object.

Next, the color signal H(x, y, t) is used to obtain a time-space image from the color region range (h$_1$, h$_2$) determined as the color of the target object. Here, it is assumed that the time-space image calculation region consist of rectangular regions surrounding the region designating frame WAKU and extending in the x- and y-directions as shown in FIG. 15B. Assuming that the region coordinates in the x-direction are (axs, axe), and that the region coordinates in the y-direction are (ays, aye), the color-signal time-space image generation formula is obtained from the following equation:

$$\text{in the } x \text{ direction } H(x, t) = \sum_{y=ays}^{y=aye} H(x, y, t) \quad (32)$$

$$\text{in the } y \text{ direction } H(y, t) = \sum_{x=axs}^{x=axe} H(x, y, t) \quad (33)$$

(when h$_1 \leq$ h $\leq$ h$_2$, H(x, y, t)=1, and when h<h$_1$ and h$_2$<h, H(x, y, t)=0)

In practice, when following the target object, a color-time-space image determined as the color of the object when t>0 is obtained. Here, it is assumed that the time-space image Generated is H(x, t). In this time-space image H(x, t), it is assumed that the point at which a change from H(x, t)=0 to H(x, t)>0 occurs is xsi, and the point at which a change from H(x, t)>0 to H(x, t)=0 occurs is xei. Here, the range expressed by (xsi, xei) exhibits characteristics. That is, an object corresponding to the color region range (h$_1$, h$_2$) exists there. As in the case of equation (22) described above, when xsi and xei are in a relationship as can be expressed by the following equation:

$$xs_{i+1} - xe_i < \epsilon_x \quad (34)$$

(here, "$\epsilon_x$" is a predetermined constant)
i and i+1 are integrated.

Figure 28:
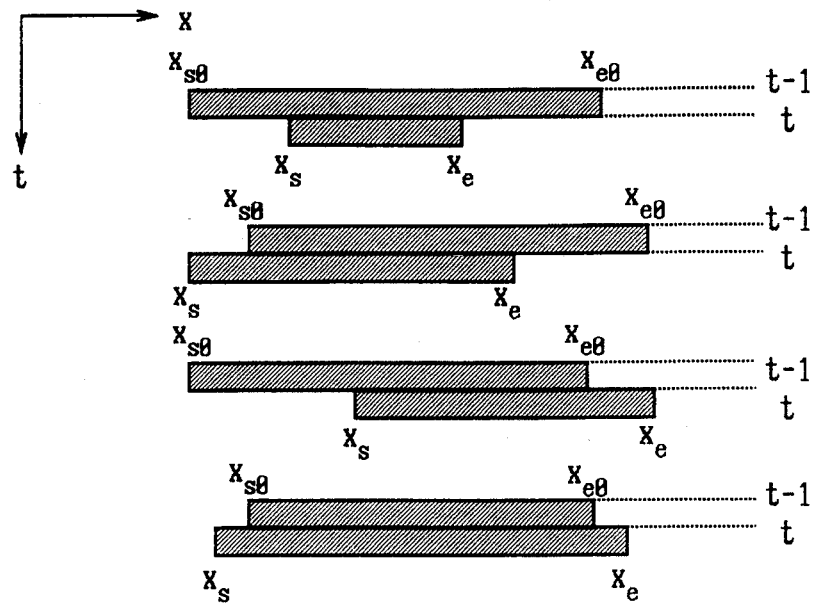
FIG. 28 is a schematic diagram explaining a method of determining target object coordinates by time continuity.

Further, as shown in FIG. 28, coordinates (xs, xe) and (ys, ye) characteristically following the coordinates (xs0, xe0) and (ys0, ye0) of the target object as obtained when t=0 are obtained. The coordinates characteristically following at this time satisfy the following continuity correlative equation:

$$xs_0 \leq xs \leq xe_0 \cap xs_0 \leq xe \leq xe_0 \quad (35)$$

$$xs \leq xs_0 \cup xe_0 \leq xe \quad (36)$$

The coordinates obtained here are judged to be the target object at the time t, whereby the zoom lens driving signal ZOOM for controlling the zoom lens motor is generated by the following equation:

$$ZOOM \propto \frac{(xe - xs + 1)(ye - ys + 1)}{(xe_0 - xs_0 + 1)(ye_0 - ys_0 + 1)} \quad (37)$$

Figure 29:
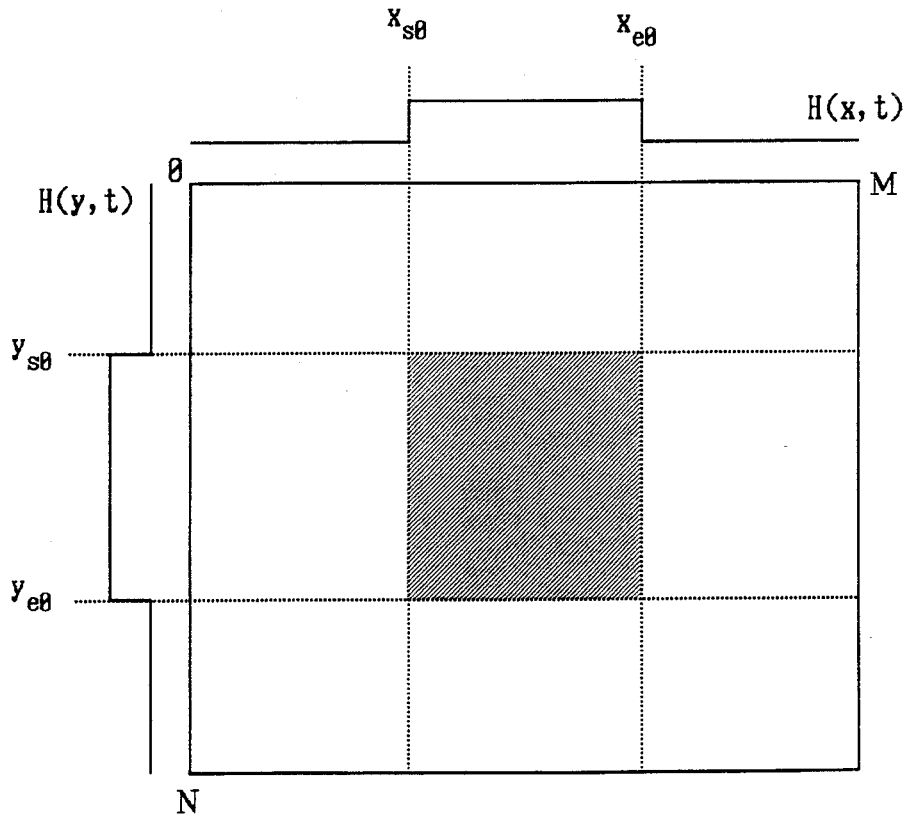
FIG. 29 is a schematic diagram explaining a reference region serving as a reference for pattern matching in the event of disappearance of the target object.

Subsequently, (xs, xe) and newly reset to (xs0, xe0) and object tracking, size judgment, and region specification are successively executed by the same procedures as described above. As shown in FIG. 29, the Y, H and S-signals in the target object region (xs0, xe0), (ys0, ye0), obtained here, are stored in the system control circuit 13 as reference signals to be used for a judgment as to whether the object once disappeared has appeared in the screen again or not.

Further, the reference signal at the point in time t−1 and the target object differential signal at the point in time t are also stored as the reference values to be referred to at the time of matching judgment. Assuming that the reference region coordinates at the time t−1 are (xs0', xe0'), (ys0', ye0'), the reference error signals ΔY, ΔH and ΔS of the Y, H and S-signals are as expressed by the following equation:

$$\Delta Y = \sum_{x=xs0'}^{xe0'} \sum_{y=ys0'}^{ye0'} |Y(x, y, t) - Y(x, y, t-1)| \quad (38)$$

$$\Delta H = \sum_{x=xs0'}^{xe0'} \sum_{y=ys0'}^{ye0'} |H(x, y, t) - H(x, y, t-1)| \quad (39)$$

-continued $$\Delta S = \sum_{x=xs0'}^{xe0'} \sum_{y=ys0'}^{ye0'} |S(x, y, t) - S(x, y, t-1)| \quad (40)$$

These signals are up-dated every hour unless condition judgment regarding crossing, disappearance, etc. is executed.

Subsequently, the system control circuit 13 obtains the time difference of the color-time-space image between the times t and t−1 from the following equation:

$$\frac{dH(x, t)}{dt} = H(x, y) - H(x, t-1) \quad (41)$$

This causes the still portions in the color-time-space image to be deleted, and information on the portions in which any movement has occurred is extracted.

Next, the system control circuit 13 executes condition detection. Here, the condition to be detected consists in a temporary disappearance of the target object due to crossing with another object (FIGS. 19A and 19B), its disappearance from the screen (FIG. 20), etc. It will be understood that, in the case of crossing in a time-space image, crossing of the target object with another object causes the width of that object to be gradually reduced by being hidden behind the other object. To utilize this phenomenon, the object width w at the time t is assumed to be $wx(t)$, $wy(t)$. Assuming the object width at the time t−1 is $wx(t-1)$, $wy(t-1)$, there is the possibility of crossing having been generated when the relationship as indicated by the following equation exist:

$$wx(t) = xe - xs + 1 \quad (42)$$
$$wy(t) = ye - ys + 1 \quad (43)$$
$$wx(t-1) = xe_0 - xs_0 + 1 \quad (44)$$
$$wy(t-1) = ye_0 - ys_0 + 1 \quad (45)$$

$$\frac{wx(t)}{wx(t-1)} < 1 \text{ and } \frac{wy(t)}{wy(t-1)} < 1 \quad (46)$$

When the time continuity is interrupted afterwards, crossing is judged to have been generated.

Further, when, as shown in FIG. 20, the object has disappeared from the screen, the movement locus of the time-space image is interrupted, so that tracking cannot be performed any longer with the same algorithm that has been used. Thus, it is necessary to make a judgment as to whether the object has disappeared from the screen or not. Suppose that the coordinates of the object are (xs0, xe0), and that the screen width is M. If the relationship of the following equation exists:

$$xs=0, xe<dw0, \text{ and } (xe-xs+1)<dw \quad (47)$$

(here, "dw0" is a predetermined constant) or $$xs>dw1, xe=M-1, \text{ and } (xe-xs+1)<dw \quad (48)$$

(here, "dw1" is a predetermined constant) the object is judged to be disappearing from the screen. When the time continuity has been lost, it is judged to have been disappeared from the screen.

Next, the system control circuit 13 performs movement vector detection by color-time-space images. As shown in FIG. 21, it is assumed that the end coordinates of the object as specified in the color-time-space image are (xs0, xe0) at a point in time t−1, and the end coordinates characteristically following the coordinates (xs0, xe0) at the point in time t are (xs, xe). It is assumed that the movement vectors obtainable from the end coordinates and the central coordinates by utilizing this continuity are mv1, mv2 and mv3.

Further, as shown in FIG. 22, in the color-time-space differential image, movement vectors are obtained from the time continuity of the movement edges in the region designating frame. Here, the movement vectors mvi are obtained with respect to all the edges in the frame. The thus obtained movement vectors mv1, mv2, mv3, mvi are synthetically judged so as to determine the final movement vector. That is, the movement amount of the maximum frequency is determined as the movement vector mv at that time from the histogram obtained from these movement vectors mv1, mv2, mv3, mvi.

From the movement vectors mvx, mvy in the x- and y-directions obtained here, the actual size of the image in the variable image compression circuit 8 and the size of the image to be processed are taken into account to Generate a panning motor driving signal PAN and a tilt motor driving signal TILT for controlling the panning motor 14 and the tilt motor 16 on the basis of the following equation:

$$PAN \propto mvx \quad (49)$$

$$TILT \propto mvy \quad (50)$$

Figure 30:
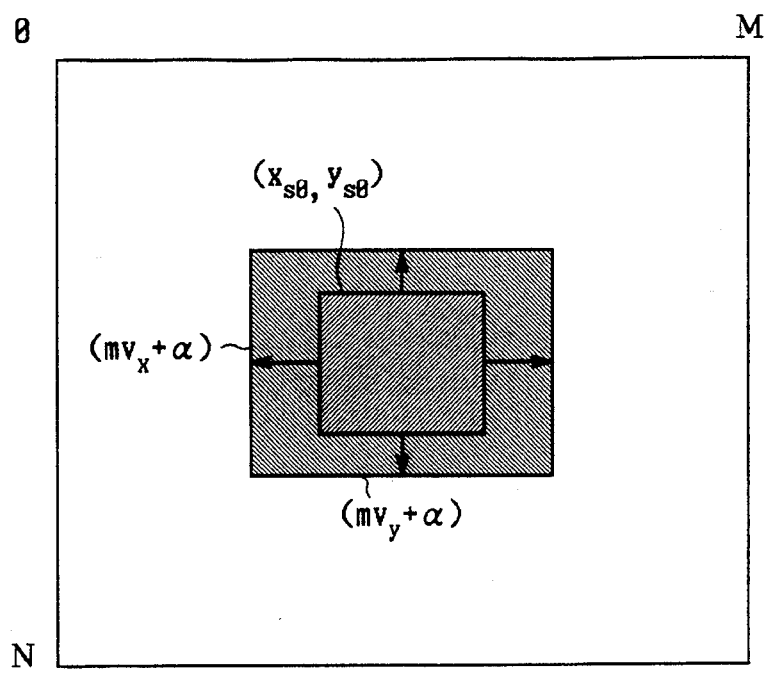
FIG. 30 is a schematic diagram showing a matching region for performing pattern matching in the event of disappearance of the target object by crossing of the target object.

Further, the system control circuit 13 in this embodiment is designed to track an object which is re-appeared by pattern matching. First, when, at condition judgment, crossing of the target object with another object is judged to have been generated, pattern matching is performed by using a reference pattern based on the Y, H and S-signals of the target object stored in the memory 10 to check whether the object has appeared again or not. It is assumed that the size of the object when it re-appears after temporary disappearance is not much different from its size at the time of its disappearance. The range for matching at this time is, as shown in FIG. 30, assumed to be ±(mvx+α), ±(mvy+α) around the position where it disappeared.

Figure 31:
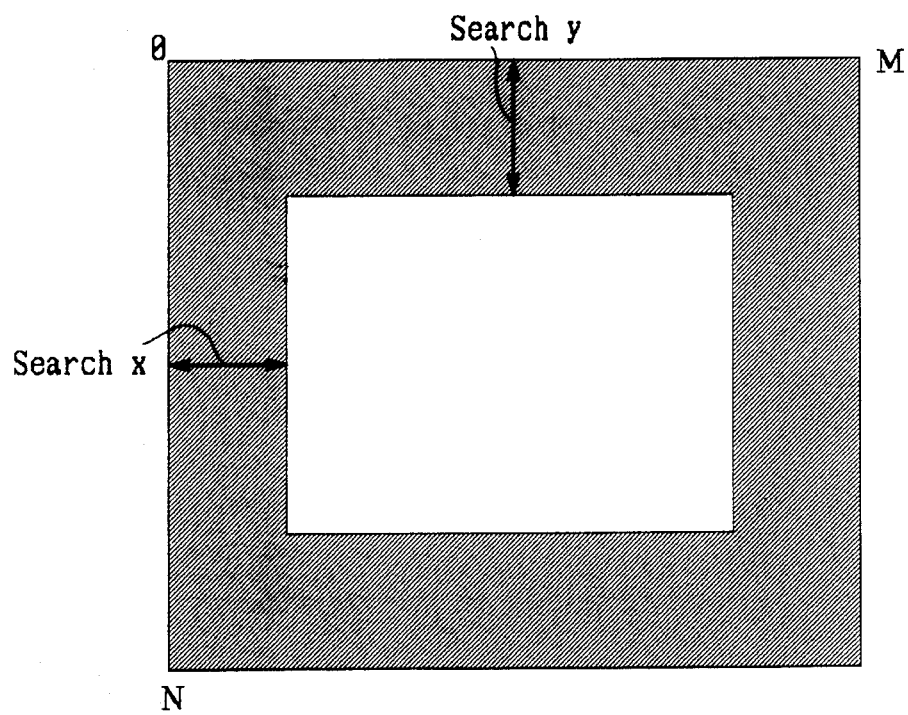
FIG. 31 is a schematic diagram showing a matching region for performing pattern matching in the event of disappearance of the target object from the screen.

In the case where, at condition judgment, the object is judged to have disappeared from the screen, pattern matching is performed by using a reference pattern based on the Y, H and S-signals stored in the memory 10 to check whether the object has appeared again or not. It is assumed that the size of the object at the time of its re-appearance is not much different from its size when it disappeared. Assuming that the range for matching is being continuously photographed, it is regarded to be around an edge portion of the image on the assumption that it appears from one of the four sides of the image as shown in FIG. 31. The error signals of the pattern matching obtained at this time will be referred to as $Y_{error}$, $H_{error}$, and $S_{error}$. If the following equations:

$$Y_{error} \leq \alpha \times \Delta Y + \epsilon \quad (51)$$

$$H_{error} \leq \beta \times \Delta H + \epsilon \quad (52)$$

$$S_{error} \leq \gamma \times \Delta S + \epsilon \quad (53)$$

(here, "ε" is a predetermined constant) hold true, the target object is judged to have appeared again. Here, the variables α, β, and γ are values determined by changes in the luminance level and color signal level of the image between the time when the reference pattern is retained and the present.

Figure 32:
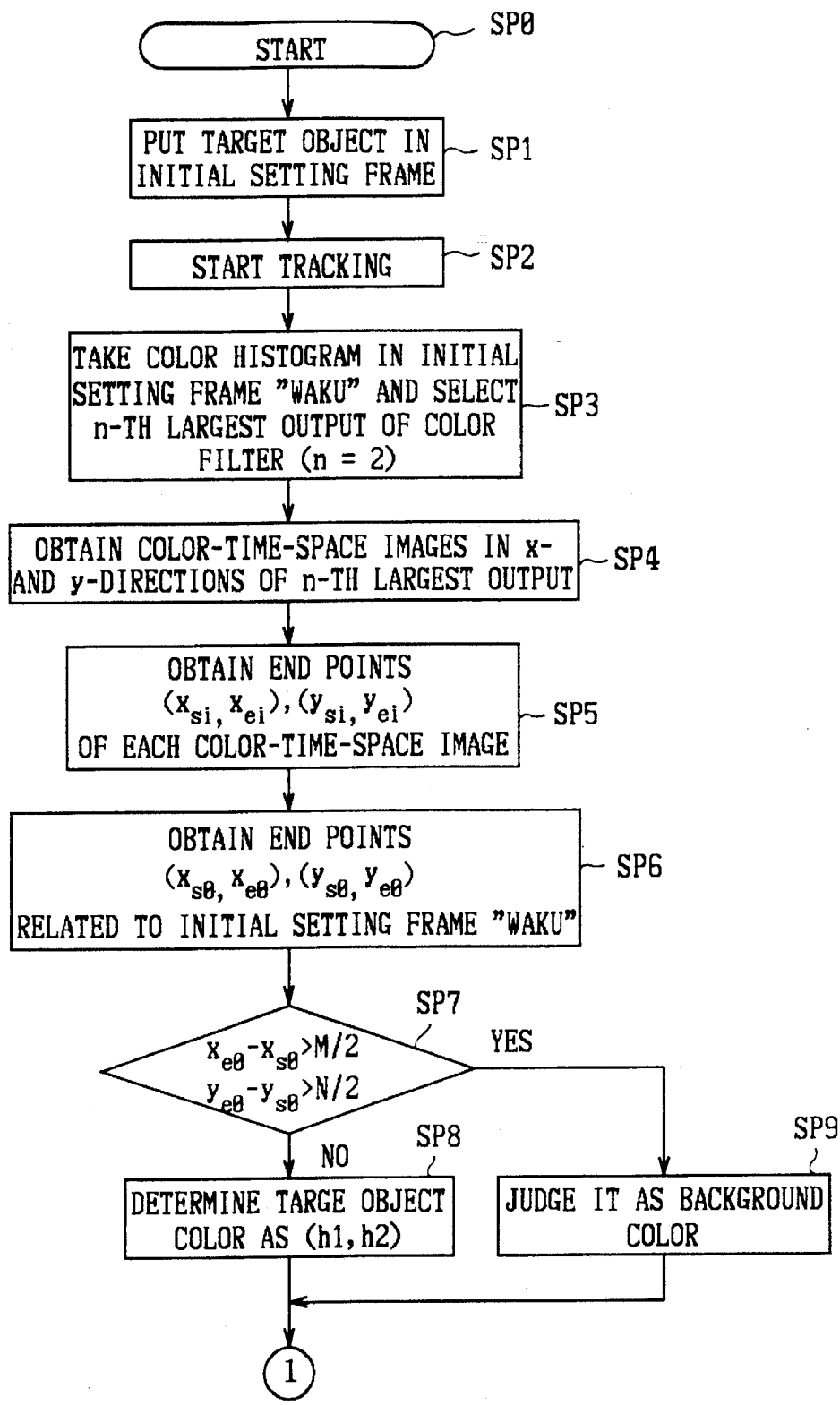
FIGS. 32 to 34 are flowcharts explaining moving object detecting and tracking procedures.
Figure 33:
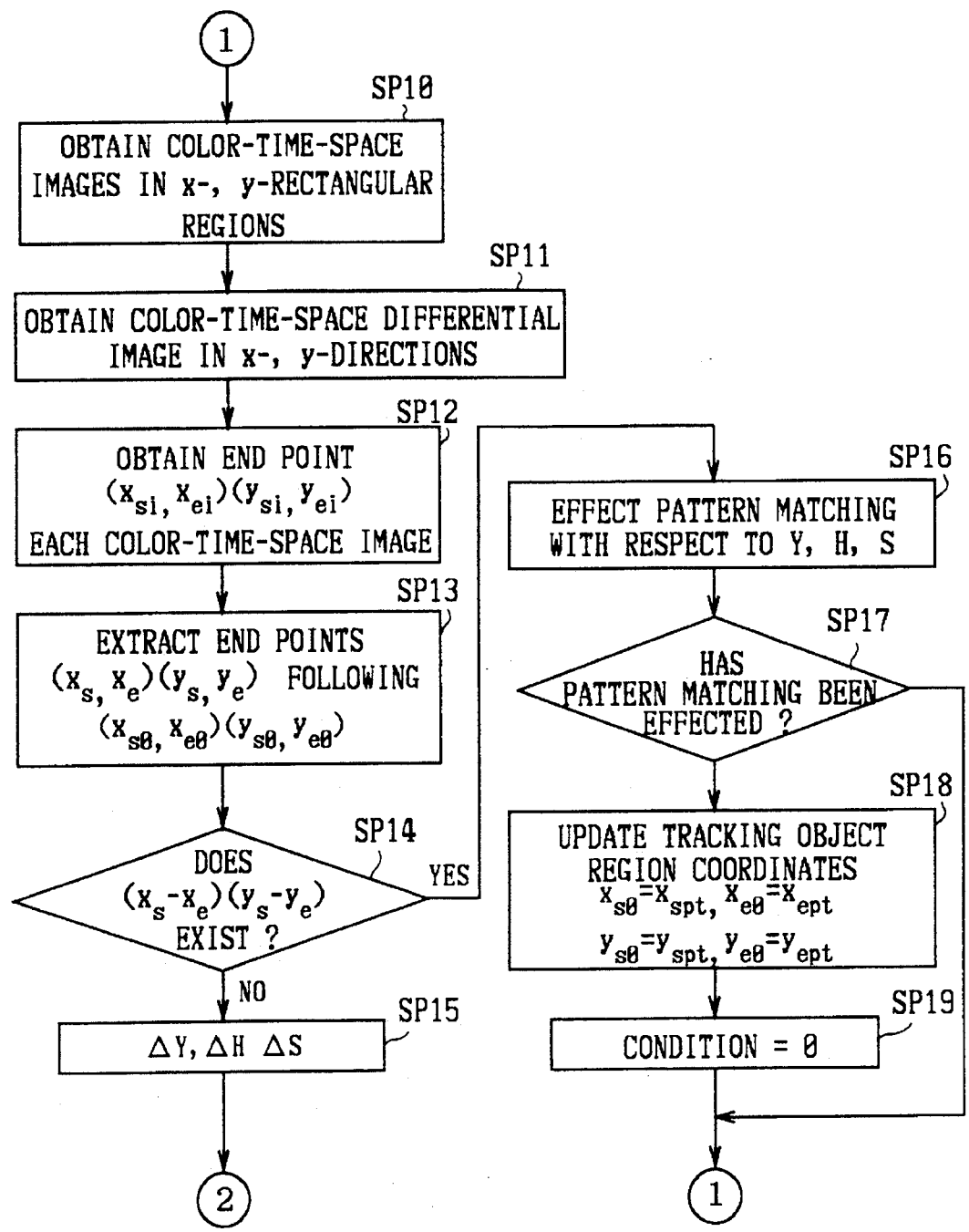
Figure 34:
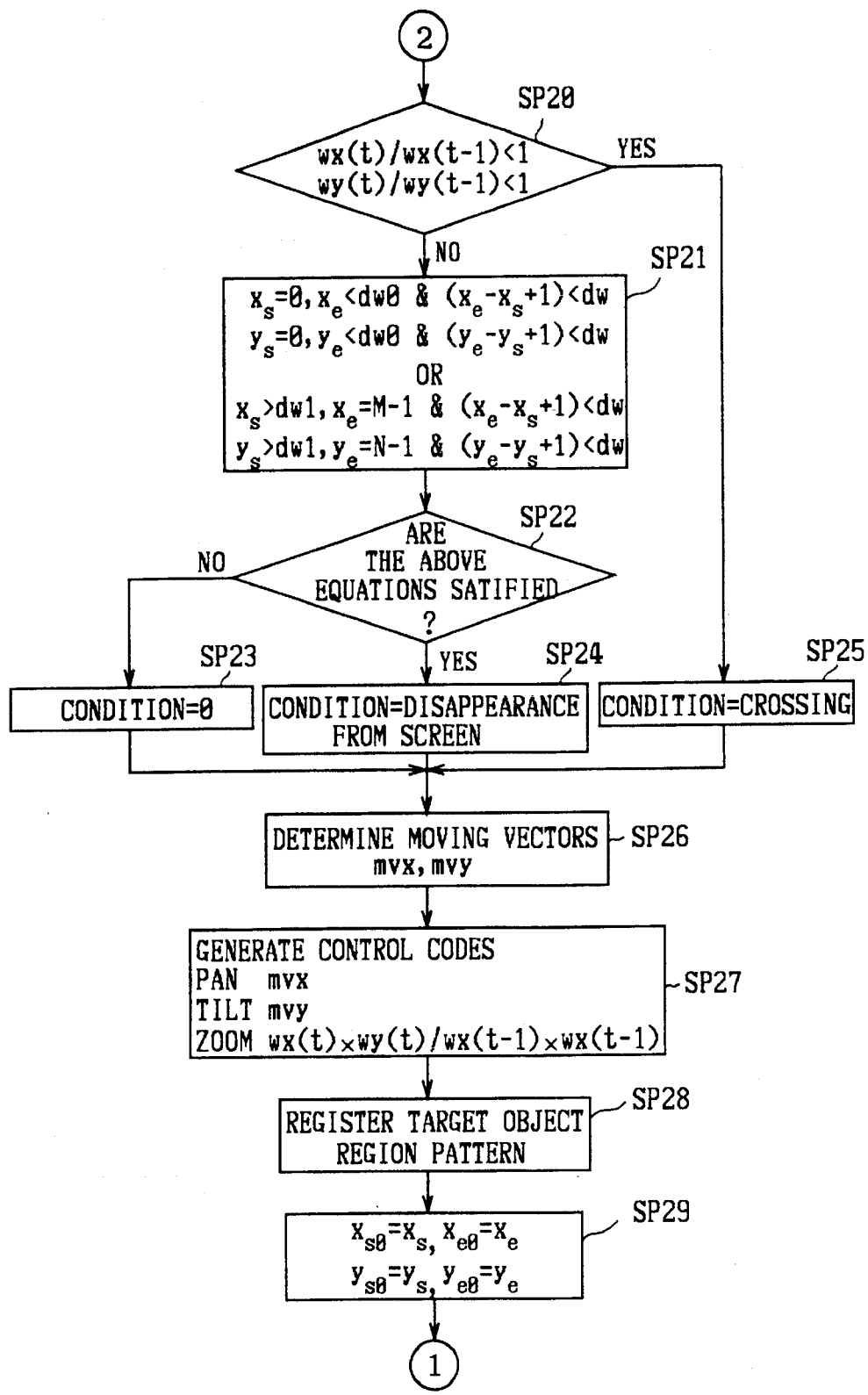

In the system control circuit 13 of the moving object detecting and tracking apparatus 30, the above-described processing can be realized by executing the moving image detection procedures SP0 of FIGS. 32, 33, and 34.

In accordance with the above-described construction, a video signal input from the photographic optical system is Y/C-separated, and then the target object is specified from the tracking region histogram. Utilizing the time continuity of the color-time-space image and the color-time-space differential image, movement vectors are obtained for each of them. The actual movement vector is determined through decision by majority on these movement vectors, whereby it is possible to realize a moving object detecting and tracking apparatus which is capable of securely detecting even the movement of a patternized object with a smaller amount of calculation as compared with the conventional block matching.

Further, in accordance with the above-described construction, movement tracking is performed utilizing time continuity information to a larger degree as compared with the conventional block matching, whereby it is possible to prevent the detected movement amount from becoming discontinuous, thereby making it possible to perform a natural tracking. Further, since the amount of information involved is smaller than in the prior art, the amount of calculation can be reduced, thereby realizing speed-up in processing and a reduction in memory capacity. Further, due to the use of compressed characteristics amount, it is possible to perform movement amount calculation without being affected by the configuration of the object, the peculiarity in its pattern, etc., and, since tracking is performed after the target object has been specified, it is possible to effectively prevent erroneous tracking even when the object has disappeared from the visual field.

Further, in accordance with the above-described construction, tracking is performed after the specification of the target object, so that it is possible to prevent erroneous tracking more effectively when the object has disappeared from the visual field as compared with the conventional methods. Further, since segmentation is successively effected while specifying the target object region, it is possible to obtain reference data for pattern matching, and, since both the tracking in the time axis direction due to the time continuity and the pattern matching in the spatial direction are used, it is possible to realize a robust tracking in various situations.

Furthermore, in accordance with the above-described construction, driving signals for controlling the camera lens, the camera body and/or the zoom lens are generated on the basis of movement amounts and deformation amounts in the x- and y-directions, whereby it is possible to automatically cope with any change in the size of the object as well as to automatically track the object. Thus, it is possible to realize a moving object detecting and tracking apparatus which is capable of photographing a target object always in a desirable size, thereby attaining a substantial improvement in terms of convenience in use.

Further, in the embodiment described above, the photographing optical system 2 is controlled, on the basis of the moving mount and the deformation in the x-and y-directions. However, this invention is not only limited to this, but may also move, magnify, or reduce the region designation frame same as the first embodiment. In this case, the coordinates of a new region designating frame can be obtained from the moving vectors in the x- and y-directions mvx, mvy, and the width of the color-time space image.

(4) Other Embodiments

While the above embodiments have been described with reference to the case where the moving object detecting and tracking apparatus is provided inside a television camera, and the movement of the target object in the image is detected and tracked by using luminance and color difference signals obtained from the digital camera processing circuit, the same effect as that of the above-described embodiment can also be realized by, instead of the above arrangement, adopting an arrangement in which the apparatus is provided separately from the television camera and the movement of the target object in the image is detected by using luminance and color difference signals obtained from the output signals of the television camera, thereby controlling the television camera to realize a tracking processing.

While the above embodiment has been described with reference to the case where the moving object detecting and tracking apparatus of this invention is applied to the tracking of a target object by moving the photographic optical system of the television camera in accordance with the movement of the target object, this should not be construed restrictively. The apparatus of this invention is also applicable, for example, to a case where a moving object on which the television camera is mounted is moved in accordance with the movement of the target object to track the target object.

While the foregoing has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An object tracking apparatus for tracking a target object within a designated region, comprising:

photographing means for photographing an object, and generating a video signal;

histogram processing means for calculating the histogram of said video signal within designated region on the initial screen;

time-space image processing means for obtaining a time-space image with respect to the range having higher frequency of said histogram; and control means for controlling said photographing means based on the locus of said time-space image.

2. An object tracking apparatus according to claim 1, wherein:

said control means controls the zooming of said photographing means based on the change of width of the locus of said time-space image.

3. An object tracking apparatus according to claim 1, further comprising:

hue detecting means for detecting the hue of said video signal, wherein:

said histogram processing means calculates the histogram of said hue.

4. An object tracking apparatus according to claim 1, further comprising:

hue detecting means for detecting the hue of said video signal; and a color filter for filtering for said hue, wherein:

said time-space image processing means calculates said time-space image with respect to the colors until upper n-th of said color filter output.

5. An object tracking apparatus according to claim 1, wherein:

said control means judges crossing of target objects or disappearance from the screen, based on the locus of said time-space image.

6. An object tracking apparatus according to claim 5, wherein:

said control means performs pattern-matching with the pattern of a target object region and the present screen, if occurred crossing of said target objects or disappearance from the screen, and judges re-appearance of said target object on the basis of the error of said pattern-matching.

7. An object tracking apparatus according to claim 1, wherein:

said control means detects the first moving amount based on the locus of said time-space image, and controls said photographing means in the photographing direction on the basis of said first moving amount.

8. An object tracking apparatus according to claim 7, further comprising:

hue detecting means for detecting the hue of said video signal, wherein:

said histogram processing means calculates the histogram of said hue and the histogram of a luminance;

said time-space image processing means generates a luminance-time-space image and a color-time-space image, with respect to the ranges having respectively higher frequency of the histogram of said hue and the histogram of said luminance; and said control means detects the second and third moving amounts based on the locus of said luminance-time-space image and color-time-space image, to detect said first moving amount corresponding to said second and third moving amounts.

9. An object tracking apparatus according to claim 7, further comprising:

hue detecting means for detecting the hue of said video signal, wherein:

said histogram processing means calculates the histogram of said hue;

said time-space image processing means generates a color-time-space image and a color-time-space differential image, with respect to the range having higher frequency of the histogram of said hue; and said control means detects the second and third moving amounts based on the locus of said color-time-space image and said color-time-space differential image, to determine said first moving amount corresponding to said second and third moving amounts.

10. An object tracking apparatus for tracking a target object within designated region, comprising:

histogram processing means for calculating the histogram of a video signal within designated region on the initial screen;

time-space image processing means for obtaining a time-space image with respect to the range having higher frequency in said histogram; and control means for controlling said designating region based on the locus of said time-space image.

11. An object tracking apparatus according to claim 10, wherein:

said control means controls the size of said designating region on the basis of change of width of the locus of said time-space image.

12. An object tracking apparatus according to claim 10, further comprising:

hue detecting means for detecting the hue of said video signal, wherein:

said histogram processing means calculates the histogram of said hue.

13. An object tracking apparatus according to claim 10, further comprising:

hue detecting means for detecting the hue of said video signal; and a color filter for filtering for said hue, wherein:

said time-space image processing means calculates said time-space image with respect to colors until upper n-th of said color filter output.

14. An object tracking apparatus according to claim 10, wherein:

said control means judges crossing of target objects and disappearance from the screen, based on the locus of said time-space image.

15. An object tracking apparatus according to claim 14, wherein:

said control means performs pattern-matching with the pattern of a target object region and the present screen, if occurred crossing of said target objects or disappearance from the screen, and judges re-appearance of said target object on the basis of the error of said pattern-matching.

16. An object tracking apparatus according to claim 10, wherein:

said control means detects the first moving amount based on the locus of said time-space image, and moves said designating region corresponding to said first moving amount.

17. An object target apparatus according to claim 16, further comprising:

hue detecting means for detecting the hue of said video signal, wherein:

said histogram processing means calculates the histograms of said hue and the histogram of a luminance;

said time-space image processing means generates a luminance-time-space image and a color-time-space image, with respect to the ranges having higher frequency respectively, of the histogram of said Hue and the histogram of said luminance; and said control means detects the second and third moving amounts based on the loci of said luminance-time-space image and color-time-space image, to determine said first moving amount corresponding to said second and third moving amounts.

18. An object target apparatus according to claim 16, further comprising:

hue detecting means for detecting the hue of said video signal, wherein:

said histogram processing means calculates the histogram of said hue;

said time-space image processing means generates a color-time-space image and a color-time-space differential image, with respect to the range having higher frequency of the histogram of said hue; and said control means detects the second and third moving amounts based on the loci of said color-time-space image and said color-time-space differential image, to determine said first moving amount corresponding to said second and third moving amounts.

19. An object tracking apparatus for tracking a target object within a designated region, comprising:

photographing means for photographing an object, and generating a video signal;

histogram processing means for calculating the histogram of said video signal within designated region on the initial screen;

time-space image processing means for obtaining a time-space image with respect to the range having higher frequency of said histogram; and control means for controlling said photographing means based on the locus of said time-space image;

wherein said control means detects the first moving amount based on the locus of said time-space image, and controls said photographing means in the photographing direction on the basis of said first moving amount.

20. An object tracking apparatus according to claim 19, further comprising:

hue detecting means for detecting the hue of said video signal, wherein:

said histogram processing means calculates the histogram of said hue and the histogram of a luminance;

said time-space image processing means generates a luminance-time-space image and a color-time-space image, with respect to the ranges having respectively higher frequency of the histogram of said hue and the histogram of said luminance; and said control means detects the second and third moving amounts based on the locus of said luminance time-space image and color-time-space image, to detect said first moving amount corresponding to said second and third moving amounts.

21. An object tracking apparatus according to claim 19, further comprising:

hue detecting means for detecting the hue of said video signal, wherein:

said histogram processing means calculates the histogram of said hue;

said time-space image processing means generates a color-time-space image and a color-time-space differential image, with respect to the range having higher frequency of the histogram of said hue; and said control means detects the second and third moving amounts based on the locus of said color-time-space image and said color-time-space differential image, to determine said first moving amount corresponding to said second and third moving amounts.

22. An object tracking apparatus for tracking a target object within a designated region, comprising:

photographing means for photographing an object, and generating a video signal;

histogram processing means for calculating the histogram of said video signal within designated region on the initial screen;

time-space image processing means for obtaining a time-space image with respect to the range having higher frequency of said histogram; and control means for controlling said photographing means based on the locus of said time-space image;

wherein said control means controls the zooming of said photographing means based on the change of width of the locus of said time-space image.

23. An object tracking apparatus for tracking a target object within a designated region, comprising:

photographing means for photographing an object, and generating a video signal;

histogram processing means for calculating the histogram of said video signal within designated region on the initial screen;

time-space image processing means for obtaining a time-space image with respect to the range having higher frequency of said histogram; and control means for controlling said photographing means based on the locus of said time-space image; and hue detecting means for detecting the hue of said video signal, wherein said histogram processing means calculates the histogram of said hue.

24. An object tracking apparatus for tracking a target object within a designated region, comprising:

photographing means for photographing an object, and generating a video signal;

histogram processing means for calculating the histogram of said video signal within designated region on the initial screen;

time-space image processing means for obtaining a time-space image with respect to the range having higher frequency of said histogram; and control means for controlling said photographing means based on the locus of said time-space image;

wherein said control means judges crossing of target objects or disappearance from the screen, based on the locus of said time-space image.

25. An object tracking apparatus according to claim 24, wherein:

said control means performs pattern-matching with the pattern of a target object region and the present screen, if occurred crossing of said target objects or disappearance from the screen, and judges re-appearance of said target object on the basis of the error of said pattern-matching.

26. An object tracking apparatus for tracking a target object within a designated region, comprising:

photographing means for photographing an object, and generating a video signal;

histogram processing means for calculating the histogram of said video signal within designated region on the initial screen;

time-space image processing means for obtaining a time-space image with respect to the range having higher frequency of said histogram;

control means for controlling said photographing means based on the locus of said time-space image;

hue detecting means for detecting the hue of said video signal; and a color filter for filtering for said hue, wherein said time-space image processing means calculates said time-space image with respect to the colors until upper n-th of said color filter output.

27. An object tracking apparatus for tracking a target object within designated region, comprising:

histogram processing means for calculating the histogram of a video signal within designated region on the initial screen;

time-space image processing means for obtaining a time-space image with respect to the range having higher frequency in said histogram; and control means for controlling said designating region based on the locus of said time-space image;

wherein said control means detects the first moving amount based on the locus of said time-space image, and moves said designating region corresponding to said first moving amount.

28. An object tracking apparatus according to claim 27, further comprising:

hue detecting means for detecting the hue of said video signal, wherein:

said histogram processing means calculates the histograms of said hue and the histogram of a luminance;

said time-space image processing means generates a luminance-time-space image and a color-time-space image, with respect to the ranges having higher frequency respectively, of the histogram of said hue and the histogram of said luminance; and said control means detects the second and third moving amounts based on the loci of said luminance-time-space image and color-time-space image, to determine said first moving amount corresponding to said second and third moving amounts.

29. An object tracking apparatus according to claim 27, further comprising:

hue detecting means for detecting the hue of said video signal, wherein:

said histogram processing means calculates the histogram of said hue;

said time-space image processing means generates a color-time-space image and a color-time-space differential image, with respect to the range having higher frequency of the histogram of said hue; and said control means detects the second and third moving amounts based on the loci of said color-time-space image and said color-time-space differential image, to determine said first moving amount corresponding to said second and third moving amounts.

30. An object tracking apparatus for tracking a target object within designated region, comprising:

histogram processing means for calculating the histogram of a video signal within designated region on the initial screen;

time-space image processing means for obtaining a time-space image with respect to the range having higher frequency in said histogram; and control means for controlling said designating region based on the locus of said time-space image;

wherein said control means controls the size of said designating region on the basis of change of width of the locus of said time-space image.

31. An object tracking apparatus for tracking a target object within designated region, comprising:

histogram processing means for calculating the histogram of a video signal within designated region on the initial screen;

time-space image processing means for obtaining a time-space image with respect to the range having higher frequency in said histogram;

control means for controlling said designating region based on the locus of said time-space image; and hue detecting means for detecting the hue of said video signal, wherein said histogram processing means calculates the histogram of said hue.

32. An object tracking apparatus for tracking a target object within designated region, comprising:

histogram processing means for calculating the histogram of a video signal within designated region on the initial screen;

time-space image processing means for obtaining a time-space image with respect to the range having higher frequency in said histogram; and control means for controlling said designating region based on the locus of said time-space image;

wherein said control means judges crossing of target objects and disappearance from the screen, based on the locus of said time-space image.

33. An object tracking apparatus according to claim 32, wherein:

said control means performs pattern-matching with the pattern of a target object region and the present screen, if occurred crossing of said target objects or disappearance from the screen, and judges re-appearance of said target object on the basis of the error of said pattern-matching.

34. An object tracking apparatus for tracking a target object within designated region, comprising:

histogram processing means for calculating the histogram of a video signal within designated region on the initial screen;

time-space image processing means for obtaining a time-space image with respect to the range having higher frequency in said histogram;

control means for controlling said designating region based on the locus of said time-space image;

hue detecting means for detecting the hue of said video signal; and a color filter for filtering for said hue, wherein said time-space image processing means calculates said time-space image with respect to colors until upper n-th of said color filter output.

* * * * *